US012281442B2

(12) United States Patent
Hunter et al.

(10) Patent No.: US 12,281,442 B2
(45) Date of Patent: Apr. 22, 2025

(54) PAPERBOARD PRODUCTS WITH IMPROVED RIGIDITY AND MOISTURE BARRIER PROPERTIES

(71) Applicant: Hoffmaster Group, Inc., Clintonville, WI (US)

(72) Inventors: Mark Hunter, Green Bay, WI (US); Jason Laatsch, Shawano, WI (US); Joe Sommers, Pulaski, WI (US); Chad Robenhorst, Appleton, WI (US); Kyle Miller, Hobart, WI (US); Randy DeCoster, Gillett, WI (US); Chad Hildebrandt, Greenville, WI (US); Breanna Van Nuland, Oconto, WI (US); Cory Christopherson, Embarrass, WI (US); Sarah Millies, Georgetown, WI (US)

(73) Assignee: Hoffmaster Group, Inc., Clintonville, WI (US)

( * ) Notice: Subject to any disclaimer, the term of this patent is extended or adjusted under 35 U.S.C. 154(b) by 0 days.

(21) Appl. No.: 18/307,676

(22) Filed: Apr. 26, 2023

(65) Prior Publication Data

US 2023/0340729 A1 Oct. 26, 2023

Related U.S. Application Data

(60) Provisional application No. 63/434,411, filed on Dec. 21, 2022, provisional application No. 63/433,754, (Continued)

(51) Int. Cl.

*B32B 3/02* (2006.01)
*A47G 19/03* (2006.01)

(Continued)

(52) U.S. Cl.

CPC ............ *D21H 13/30* (2013.01); *A47G 19/03* (2013.01); *D21H 17/28* (2013.01); *D21H 19/24* (2013.01); *D21H 19/74* (2013.01); *B31B 50/592* (2018.05)

(58) Field of Classification Search

CPC ........ D21H 19/00; D21H 19/12; D21H 19/74; D21H 19/84

See application file for complete search history.

(56) References Cited

U.S. PATENT DOCUMENTS

2009/0173775 A1* 7/2009 Swoboda ............. B31F 1/0077 229/407

FOREIGN PATENT DOCUMENTS

EP 1332972 A2 8/2003

OTHER PUBLICATIONS

1 International Search Report & Written Opinion, PCT/US2023/066260 dated Jul. 25, 2023.

* cited by examiner

*Primary Examiner* — Elizabeth E Mulvaney

(74) *Attorney, Agent, or Firm* — Finnegan, Henderson, Farabow, Garrett & Dunner, LLP

(57) ABSTRACT

Aspects of the present disclosure include a rigid paperboard product comprising at least one modified starch and at least one crosslinker, wherein the at least one modified starch is present in an amount ranging from 2% to 20% by weight of the paperboard product, wherein the at least one crosslinker is present in an amount ranging from 0.5% to 8% by weight based on the dry weight of the starch content in the paperboard product, and wherein the paperboard product has a rigidity value ranging from 375 to 500.

18 Claims, 16 Drawing Sheets

Related U.S. Application Data filed on Dec. 19, 2022, provisional application No. 63/338,481, filed on May 5, 2022, provisional application No. 63/334,825, filed on Apr. 26, 2022.

(51) Int. Cl.

| | |
|---|---|
| ***D21H 13/30*** | (2006.01) |
| ***D21H 17/28*** | (2006.01) |
| ***D21H 19/24*** | (2006.01) |
| ***D21H 19/74*** | (2006.01) |
| *B31B 50/59* | (2017.01) |

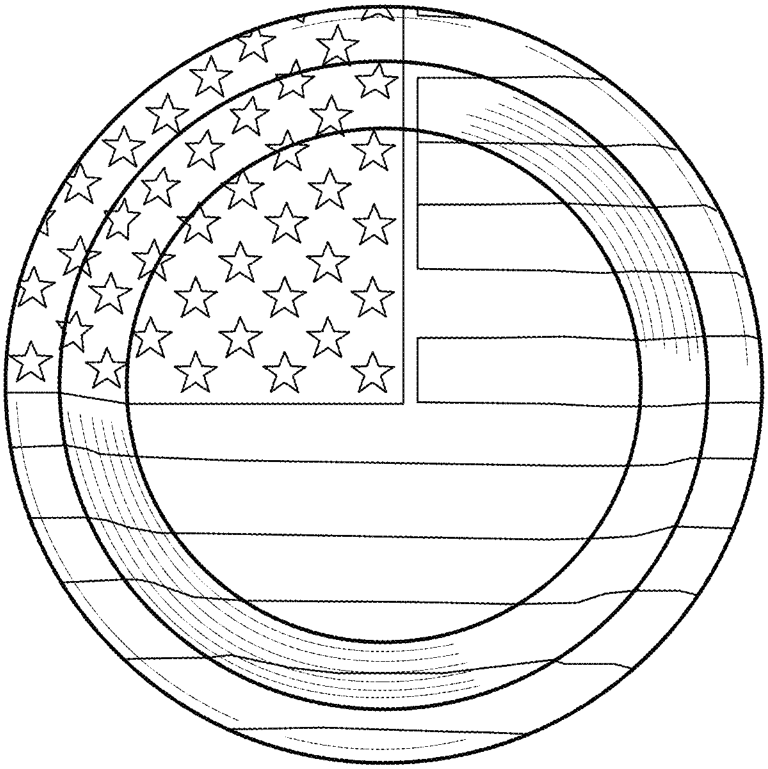
Figure 3. Login Sample Photo: Flag Plate Box 4
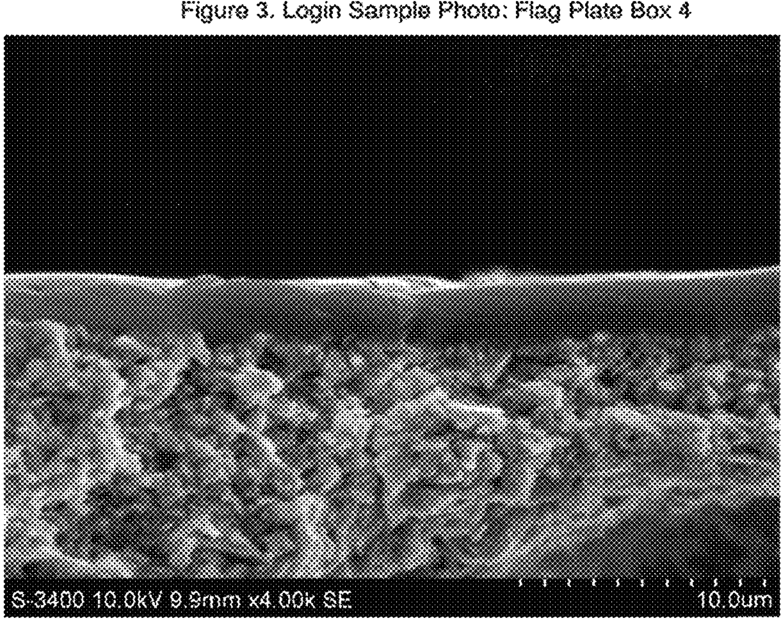
Figure 4. Clearcoat Thickness, SEM Flag Plate Box 4

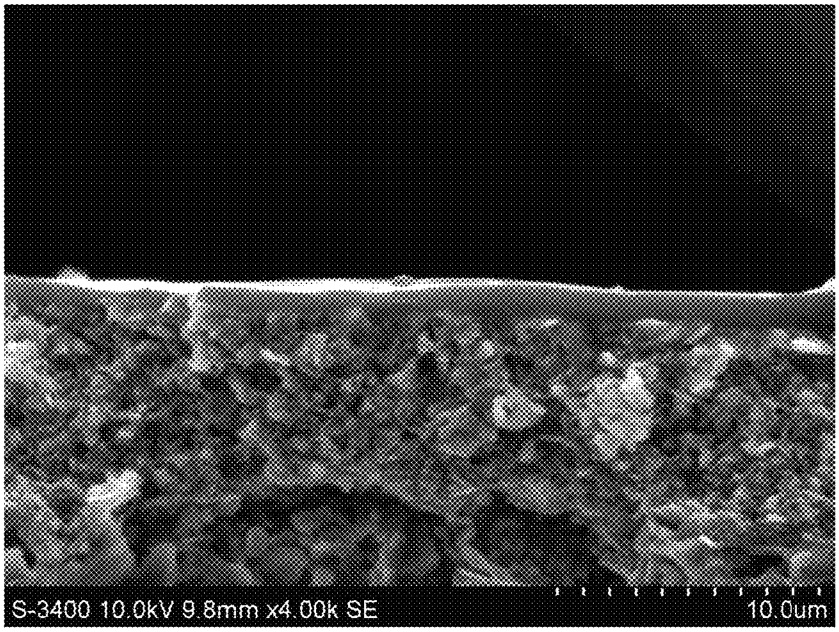
Figure 5. Clearcoat Thickness, SEM Flag Plate Box 4
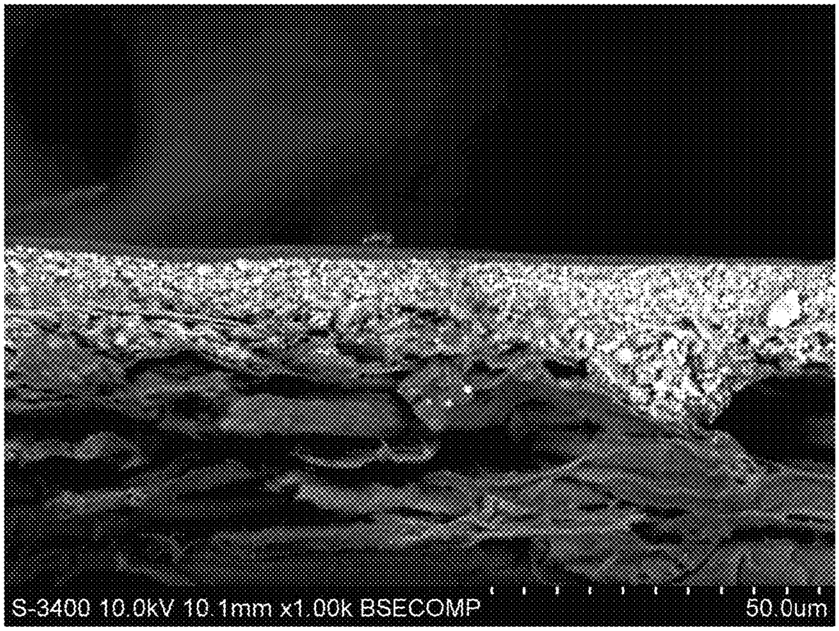
Figure 6. Claycoat Thickness, SEM Flag Plate Box 4

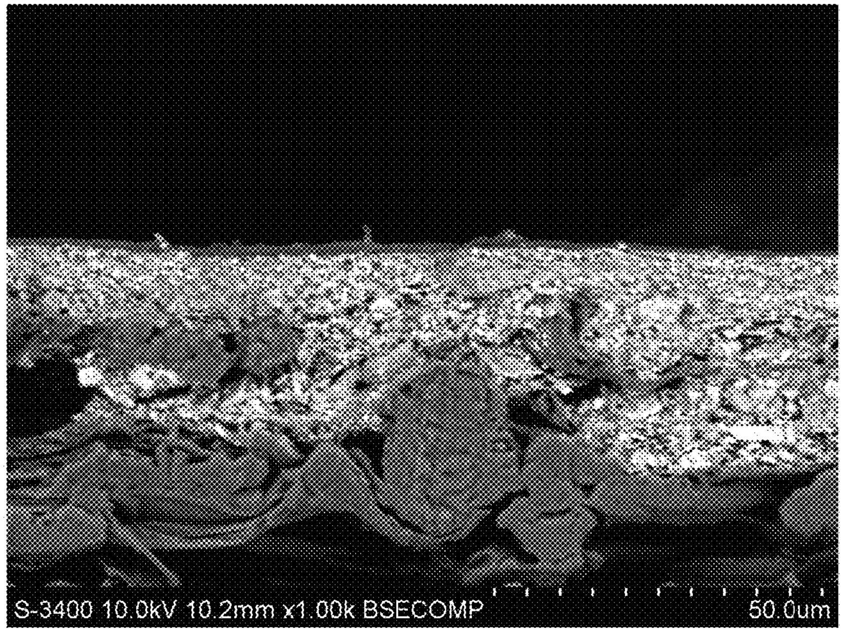
Figure 7. Claycoat Thickness, SEM Flag Plate Box 4
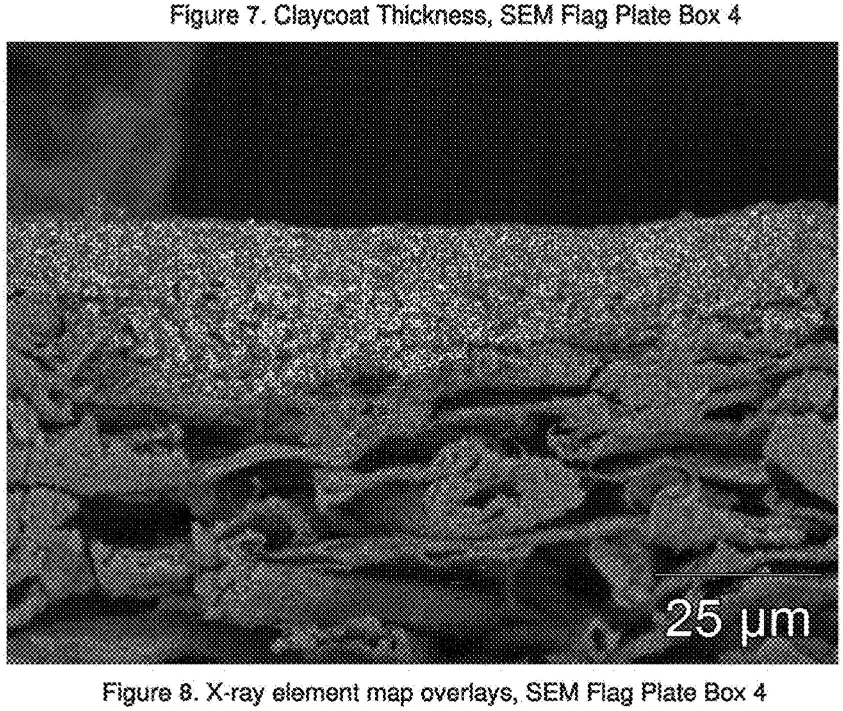
Figure 8. X-ray element map overlays, SEM Flag Plate Box 4

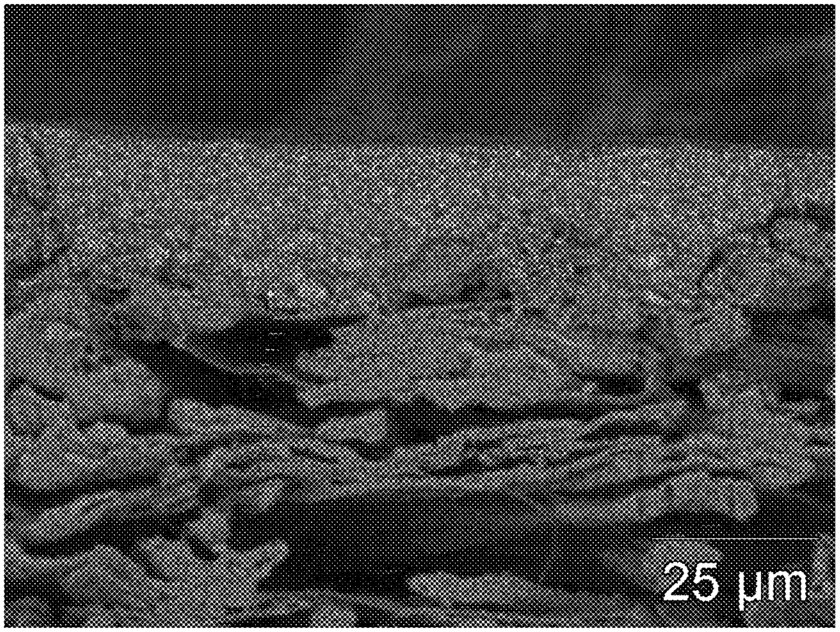
Figure 9. X-ray element map overlays. SEM Flag Plate Box 4

PAPERBOARD PRODUCTS WITH IMPROVED RIGIDITY AND MOISTURE BARRIER PROPERTIES

This application claims the benefit of priority to U.S. Provisional Application No. 63/334,825, filed Apr. 26, 2022, U.S. Provisional Application No. 63/338,481, filed May 5, 2022, U.S. Provisional Application No. 63/433,754, filed Dec. 19, 2022, and U.S. Provisional Application No. 63/434,411, filed Dec. 21, 2022, which are each incorporated by reference in their entirety.

The present disclosure is directed to paperboard products with improved rigidity and moisture barrier properties. More specifically, the disclosure is directed to paperboard products, such as plates, platters, trays, cutting boards, bowls, cups, and take-out packaging products that have higher rigidity values and increased moisture barrier properties compared to conventional paperboard products currently on the market.

A need exists for paperboard products with improved rigidity and moisture barrier properties to meet customer demands. The current disclosure provides methods for increasing these properties through material engineering, improved processing techniques, or a combination of the two. Common to all embodiments of the present disclosure is the paperboard products comprising at least one modified starch and at least one crosslinker.

Rigidity of a paperboard product generally refers to the measure of resistance of the paperboard product to bending and/or buckling. The Foodservice Packaging Institute (FPI), a trade association that represents the foodservice packaging industry, developed its FPI rigidity test to provide a standard method of measuring the rigidity of paperboard products. FPI rigidity is measured in grams of force required to deflect the rim of a paperboard product by 0.5 inches while the paperboard product is supported at its geometric mean center.

The rigidity values set forth throughout the present disclosure are determined by measuring the FPI Rigidity value of the paperboard product and dividing that value by the basis weight in pounds/3000 $ft^2$ ream of the paperboard blank, wherein the paperboard blank has a 6% moisture. Accordingly, the rigidity values set forth in the present disclosure are normalized through this calculation.

General embodiments of the present disclosure are directed to rigid paperboard products comprising at least one modified starch and at least one crosslinker, wherein the at least one modified starch is present in an amount ranging from 2% to 20% by weight of the paperboard product, wherein the at least one crosslinker is present in an amount ranging from 0.5% to 8% by weight based on the dry weight of the starch content in the paperboard product, and wherein the paperboard product has a rigidity value ranging from 375 to 500.

A further embodiment of the present disclosure is directed to a rigid paperboard product comprising at least one amylopectin and at least one crosslinker, wherein the at least one amylopectin is present in an amount ranging from 2% to 20% by weight of the paperboard product, wherein the at least one crosslinker is present in an amount ranging from 0.5% to 8% by weight based on the dry weight of the starch content in the paperboard product, and wherein the paperboard product has a rigidity value ranging from 375 to 500.

Another embodiment of the present disclosure is directed to a paperboard product comprising a backside additive comprising at least one modified starch and at least one crosslinker, wherein the at least one modified starch is present in an amount ranging from 2% to 20% by weight of the paperboard product, wherein the at least one crosslinker is present in an amount ranging from 0.5% to 8% by weight based on the dry weight of the starch content in the paperboard product, and wherein the paper board product has a rigidity value ranging from 375 to 500.

A further embodiment of the present disclosure is directed to a paperboard product comprising at least one modified starch and at least one crosslinker, wherein the paperboard product has an elliptically-shaped outer perimeter and further comprises: a substantially planar bottom region; a substantially frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the product, the frustoconical sidewall extends upward and outward from the bottom region at an angle of 22.0±0.5 degrees from a vertical line parallel to a central axis of the product, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the product.

Another embodiment of the present disclosure is directed to a paperboard product comprising at least one modified starch and at least one crosslinker, wherein the paperboard product has a circular-shaped outer perimeter and further comprises: a substantially planar bottom region; a frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the product, the frustoconical sidewall extends upward and outward from the bottom region at an angle of 24.0±0.5 degrees from a vertical line parallel to a central axis of the product, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the product.

Another embodiment of the present disclosure is directed to a process for making a rigid paperboard product, the process comprising: a) providing a paperboard material to a die press in a plate former; b) applying pressure to the plate former in an amount ranging from four tons to eleven tons; c) applying a backside coating to the formed plate using a press coater, wherein the backside coating comprises at least one modified starch in an amount ranging from 2% to 20% by weight of the paperboard product, and at least one crosslinker in an amount ranging from 0.5% to 8% by weight based on the dry weight of the starch content in the paperboard product.

Another embodiment of the present disclosure is directed to a process for making a rigid paper plate, the process comprising: a) providing a paperboard material to a die press in a plate former, wherein the die press has a rim design configured to produce a circular-shaped plate comprising a substantially planar bottom region; a frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the plate, the frustoconical sidewall extends upward and outward from the bottom region at an angle of 24.0±0.5 degrees from a vertical line parallel to a central axis of the plate, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the plate; b) applying pressure to the plate former in an amount ranging from four tons to eleven tons; and c) applying a backside coating to the formed plate using a press coater, wherein the backside coating comprises at least one modified starch and at least one crosslinker.

A further embodiment of the present disclosure is directed to a process for making a rigid paper plate, the process comprising: a) providing a paperboard material to a die press in a plate former, wherein the die press has a rim design configured to produce an elliptically-shaped plate comprising a substantially planar bottom region; a substantially frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the plate, the frustoconical sidewall extends upward and outward from the bottom region at an angle of 22.0±0.5 degrees from a vertical line parallel to a central axis of the plate, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the plate; b) applying pressure to the plate former in an amount ranging from four tons to eleven tons; and c) applying a backside coating to the formed plate using a press coater, wherein the backside coating comprises at least one modified starch and at least one crosslinker.

BRIEF DESCRIPTION OF THE DRAWINGS

FIG. 3 depicts a photo of a sample plate in accordance with the present disclosure.

FIGS. 4 and 5 depict images from the SEM/Microscopy testing directed to clearcoat thickness of the sample plate in FIG. 3.

FIGS. 6 and 7 depict images from the SEM/Microscopy testing directed to claycoat thickness of the sample plate in FIG. 3.

FIGS. 8 and 9 depict an image from the SEM/Microscopy testing directed to X-ray element map overlays of the sample plate in FIG. 3.

Figure 1B:
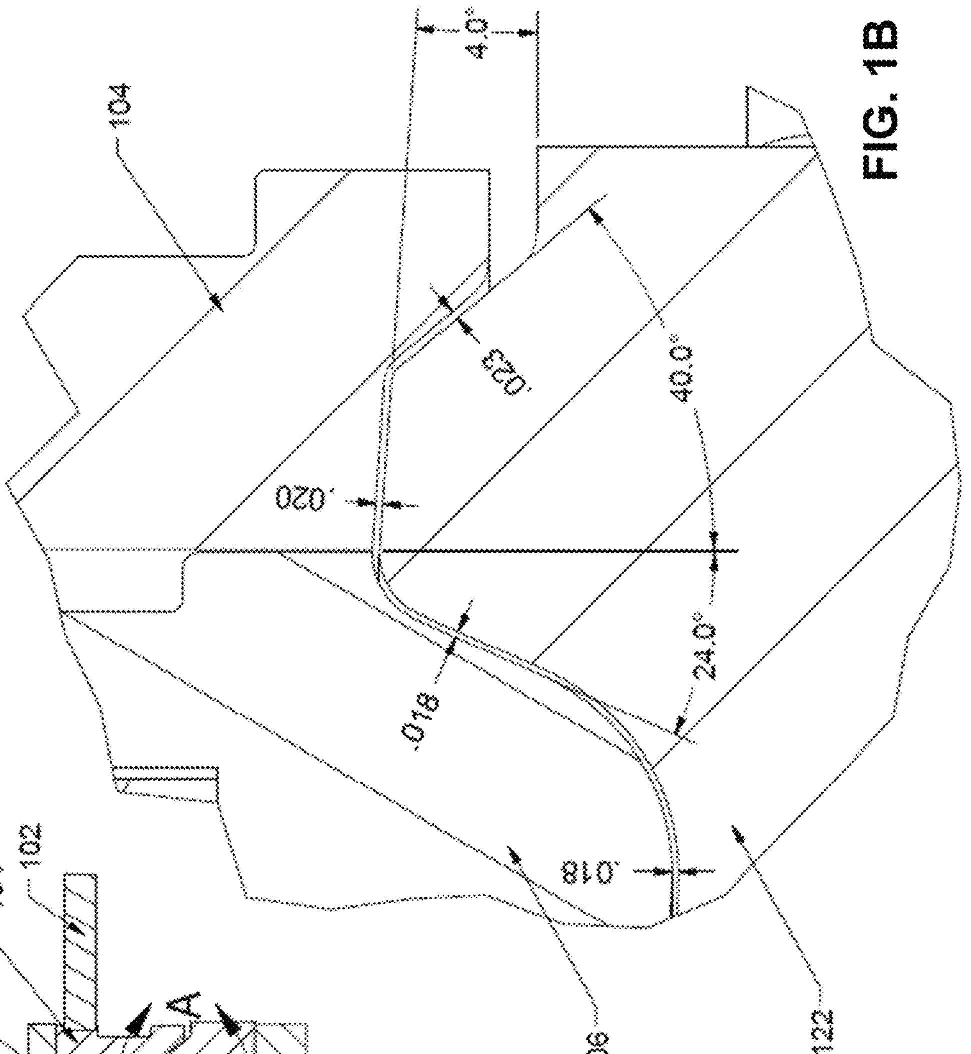
FIG. 1B depicts a blow-up of a portion of the die design of FIG. 1A.

Embodiments of the present disclosure are directed to paperboard products having improved rigidity. In these embodiments, the rigid paperboard product comprises at least one modified starch and at least one crosslinker, wherein the at least one modified starch is present in an amount ranging from 2% to 20% by weight of the paperboard product, wherein the at least one crosslinker is present in an amount ranging from 0.5% to 8% by weight based on the dry weight of the starch content in the paperboard product.

A variety of paperboard products are contemplated in the present disclosure. Non-limiting examples of these paperboard products include plates, platters, trays, cutting boards, bowls, cups, and take-out packaging products. A variety of plates are also contemplated, including round and oval plates, such as 10.25" round plates and 10"×12" oval plates. The plates can be manufactured in a variety of thicknesses depending on the desired end use and non-limiting examples of the thickness include 12-point, 14-point, 16-point, 18-point, 20-point, 22-point, 24-point, and 28-point plates. As used herein, paper thickness is measured in thousandths of an inch, referred to as "points," and a 22-point plate, for example, will have a thickness equal to 0.022 inches.

The paperboard products according to the present disclosure can be made using commercially available paper stock. Non-limiting examples include paper stock available from Graphic Packaging International (GPI), such as GPI 20-point Premium platestock, which has a target basis weight of 221.5 pounds/3000 $ft^2$, GPI 24-point platestock, which has a target basis weight of 257.0 pounds/3000 $ft^2$, and Everest 28-point folding carton board, which has a target basis weight of 303.0 pounds/3000 $ft^2$. Additional non-limiting, exemplary paper stock includes 18-point Clearwater paperboard blanks, 20-point WestRock paperboard blanks, 22-point WestRock paperboard blanks, and 24-point SAPPI paperboard blanks. In certain embodiments, the basis weight of the paper stock and paperboard blanks range from 120 pounds/3000 $ft^2$ to 320 pounds/3000 $ft^2$, such as from 160 pounds/3000 $ft^2$ to 310 pounds/3000 $ft^2$, from 180 pounds/3000 $ft^2$ to 310 pounds/3000 $ft^2$, from 200 pounds/3000 $ft^2$ to 310 pounds/3000 $ft^2$, from 220 pounds/3000 $ft^2$ to 310 pounds/3000 $ft^2$, and from 140 pounds/3000 $ft^2$ to 310 pounds/3000 $ft^2$.

The paperboard products according to the present disclosure can be press molded from a paper blank or pulp molded from a wet-processed pulp.

Non-limiting examples of suitable modified starches according to the present disclosure include ethylated starches, amylopectin starches, and combinations thereof. In certain embodiments of the present disclosure, the amylopectin starches are chosen from highly branched amylopectins. Non-limiting examples of suitable modified starches include Ingredion™ PenCote™ L800, Ingredion™ PenCote™ L1000, Ingredion™ Redifilm™ 5400, Ingredion™ Redifilm™ 5800, Ingredion™ Redifilm™ 2030, and EcoSynthetix® EcoSphere® 2330. The at least one modified starch can be present in an amount ranging from 2% to 20% dry solids by weight of the paperboard product, and non-limiting exemplary ranges include from 2% to 18% by weight, from 2% to 15% by weight, from 2% to 12% by weight, from 2% to 10% by weight, from 2% to 8% by weight, from 3% to 20% by weight, from 3% to 18% by weight, from 3% to 15% by weight, from 3% to 12% by weight, from 3% to 10% by weight, from 3% to 8% by weight, from 5% to 20% by weight, from 5% to 18% by weight, from 5% to 15% by weight, 5% to 12% by weight, from 5% to 10% by weight, from 5% to 8% by weight, from 7% to 20% by weight, from 7% to 18% by weight, from 7% to 15% by weight, from 7% to 12% by weight, from 7% to 10% by weight, from 10% to 20% by weight, and from 10% to 18% by weight, and from 10% to 15% by weight.

Non-limiting examples of suitable crosslinkers include glyoxal crosslinkers, potassium zirconium crosslinkers, ammonia zirconium crosslinkers, citric acid crosslinkers, and combinations thereof. In certain embodiments, the amount of glyoxal crosslinkers do not exceed 6% by weight based on the dry weight of the starch content in the paperboard product. Non-limiting, exemplary ranges of the amount of glyoxal crosslinker include from 0.5 to 6% dry weight of the starch, such as 0.5% to 5.5% by weight, 0.5% to 5% by weight, 0.5% to 4.5% by weight, 0.5% to 4% by weight, 0.5% to 3.5% by weight, 0.5% to 3% by weight, 0.5% to 2.5% by weight, 0.5% to 2% by weight, 1% to 5.5% by weight, 1% to 5% by weight, 1% to 4.5% by weight, 1% to 4% by weight, 1% to 3.5% by weight, 1% to 3% by weight, 1% to 2.5% by weight, 1.5% to 5.5% by weight, 1.5% to 5% by weight, 1.5% to 4.5% by weight, 1.5% to 4% by weight, 1.5% to 3.5% by weight, and 1.5% to 3% by weight. In other embodiments, the amount of the at least one zirconium and ammonia crosslinkers does not exceed 5% dry weight of the starch content in the paperboard product. Non-limiting, exemplary ranges of the amount of zirconium and/or ammonia crosslinkers include 0.5% to 4.5% by weight, 0.5% to 4% by weight, 0.5% to 3.5% by weight, 0.5% to 3% by weight, 0.5% to 2.5% by weight, 0.5% to 2% by weight, 0.5% to 1.5% by weight, by weight, 1% to 4.5% by weight, 1% to 4% by weight, 1% to 3.5% by weight, 1% to 3% by weight, 1% to 2.5% by weight, 1% to 2% by weight, 1.5% to 4.5% by weight, 1.5% to 4% by weight, 1.5% to 3.5% by weight, 1.5% to 3% by weight, 1.5% to 2.5% by weight, 2% to 4.5% by weight, 2% to 4% by weight, 2% to 3.5% by weight, 2% to 3% by weight, and 2% to 2.5% by weight. In some embodiments, the amount of the at least one zirconium and ammonia crosslinker does not exceed 2.5% dry weight of the starch content in the paperboard product.

In certain embodiments of the present disclosure, the paperboard product comprises at least one amylopectin and at least one crosslinker, wherein the at least one amylopectin is present in an amount ranging from 2% to 20% by weight of the paperboard product, and the at least one crosslinker is present in an amount ranging from 0.5% to 8% by weight based on the dry weight of the starch content in the paperboard product. Non-limiting examples of suitable amylopectins include PenCote™ L800, Redifilm™ 5800 and EcoSphere® 2330. Non-limiting, exemplary ranges of the amount of at least one amylopectin include from 2% to 18% by weight, from 2% to 15% by weight, from 2% to 12% by weight, from 2% to 10% by weight, from 2% to 8% by weight, from 3% to 20% by weight, from 3% to 18% by weight, from 3% to 15% by weight, from 3% to 12% by weight, from 3% to 10% by weight, from 3% to 8% by weight, from 5% to 20% by weight, from 5% to 18% by weight, from 5% to 15% by weight, 5% to 12% by weight, from 5% to 10% by weight, from 5% to 8% by weight, from 7% to 20% by weight, from 7% to 18% by weight, from 7% to 15% by weight, from 7% to 12% by weight, from 7% to 10% by weight, from 10% to 20% by weight, and from 10% to 18% by weight, and from 10% to 15% by weight. In certain embodiments, the at least one amylopectin is present in an amount ranging from 10 to 20% based on the weight of the paperboard product.

In further embodiments, the at least one amylopectin and the at least one crosslinker are comprised in one of the following combinations: Ingredion™ PenCote™ L800 and a glyoxal crosslinker; Ingredion™ Redifilm™ 5800 and a glyoxal crosslinker; EcoSynthetix® EcoSphere® 2330 and a glyoxal crosslinker; Ingredion™ PenCote™ L800 and a potassium zirconium crosslinker; Ingredion™ Redifilm™

5800 and a potassium zirconium crosslinker; and EcoSynthetix® EcoSphere® 2330 and a potassium zirconium crosslinker.

In certain embodiments, the paperboard products according to the present disclosure have a rigidity value ranging from 375 to 500. Non-limiting, exemplary ranges include rigidity values of 400 to 500, 425 to 500, 450 to 500, 475 to 500, 375 to 475, 400 to 475, 425 to 475, 450 to 475, 375 to 450, 400 to 450, 425 to 450, 375 to 425, and 400 to 425. In certain embodiments, these rigidity values are produced in paper products formed from 18-point, 20-point, 22-point, and 24-point paper stock.

Additional embodiments of the present disclosure are directed to optimizing backside additive effectiveness. In certain embodiments, the backside additive comprises a combination of at least one modified starch and at least one crosslinker, wherein the at least one modified starch is present in an amount ranging from 2% to 20% dry solids by weight of the paperboard product and the one crosslinker is present in an amount ranging from 0.5% to 8% by weight based on the dry weight of the starch content in the paperboard product.

Non-limiting, exemplary ranges of the amount of at least one modified starch in the backside additive include from 2% to 18% by weight, from 2% to 15% by weight, from 2% to 12% by weight, from 2% to 10% by weight, from 2% to 8% by weight, from 3% to 20% by weight, from 3% to 18% by weight, from 3% to 15% by weight, from 3% to 12% by weight, from 3% to 10% by weight, from 3% to 8% by weight, from 5% to 20% by weight, from 5% to 18% by weight, from 5% to 15% by weight, 5% to 12% by weight, from 5% to 10% by weight, from 5% to 8% by weight, from 7% to 20% by weight, from 7% to 18% by weight, from 7% to 15% by weight, from 7% to 12% by weight, from 7% to 10% by weight, from 10% to 20% by weight, and from 10% to 18% by weight, and from 10% to 15% by weight.

In these embodiments, the backside additive also comprises at least one crosslinker, and non-limiting examples of suitable crosslinkers include glyoxal crosslinkers, potassium zirconium crosslinkers, ammonia zirconium crosslinkers, citric acid crosslinkers, and combinations thereof. In embodiments wherein the backside additive comprises a glyoxal crosslinker, non-limiting, exemplary ranges of the amount of glyoxal crosslinker include from 0.5 to 6% dry weight of the starch, such as 0.5% to 5.5% by weight, 0.5% to 5% by weight, 0.5% to 4.5% by weight, 0.5% to 4% by weight, 0.5% to 3.5% by weight, 0.5% to 3% by weight, 0.5% to 2.5% by weight, 0.5% to 2% by weight, 1% to 5.5% by weight, 1% to 5% by weight, 1% to 4.5% by weight, 1% to 4% by weight, 1% to 3.5% by weight, 1% to 3% by weight, 1% to 2.5% by weight, 1.5% to 5.5% by weight, 1.5% to 5% by weight, 1.5% to 4.5% by weight, 1.5% to 4% by weight, 1.5% to 3.5% by weight, and 1.5% to 3% by weight. In embodiments when the backside additive comprises at least one zirconium and ammonia crosslinker, non-limiting, exemplary ranges of the amount of zirconium and ammonia crosslinkers include 0.5% to 5% by weight, 0.5% to 4.5% by weight, 0.5% to 4% by weight, 0.5% to 3.5% by weight, 0.5% to 3% by weight, 0.5% to 2.5% by weight, 0.5% to 2% by weight, 0.5% to 1.5%, by weight, 1% to 4.5% by weight, 1% to 4% by weight, 1% to 3.5% by weight, 1% to 3% by weight, 1% to 2.5% by weight, 1% to 2% by weight, 1.5% to 4.5% by weight, 1.5% to 4% by weight, 1.5% to 3.5% by weight, 1.5% to 3% by weight, 1.5% to 2.5% by weight, 2% to 4.5% by weight, 2% to 4% by weight, 2% to 3.5% by weight, 2% to 3% by weight, and 2% to 2.5% by weight.

In further embodiments, the backside additive comprises one of the following combinations: Ingredion™ PenCote™ L800 and a glyoxal crosslinker; Ingredion™ Redifilm™ 5800 and a glyoxal crosslinker; EcoSynthetix® EcoSphere® 2330 and a glyoxal crosslinker; Ingredion™ PenCote™ L800 and a potassium zirconium crosslinker; Ingredion™ Redifilm™ 5800 and a potassium zirconium crosslinker; and EcoSynthetix® EcoSphere® 2330 and a potassium zirconium crosslinker. It is contemplated that these combinations of modified starches and crosslinkers can be combined in any of the amounts disclosed above.

In more particular embodiments, the frontside of the paperboard product comprises a clearcoat. Non-limiting examples of clearcoats include water-based clearcoats such as aqueous dispersions of styrene-acrylic copolymers. Non-limiting examples include clearcoats produced by CA Coatings, such as Clear Aquavar™2044DE and Clear Aquavar™ 2120DE.

In further embodiments, the paperboard product has a coatings package comprising a backside additive and a frontside clearcoat. In these embodiments, the coated paperboard product comprises one of the following combinations:

- a backside additive comprising Ingredion™ PenCote™ L800 and a glyoxal crosslinker, and Clear Aquavar™ 2044DE as the clearcoat;
- a backside additive comprising Ingredion™ Redifilm™ 5800 and a glyoxal crosslinker, and Clear Aquavar™ 2044DE as the clearcoat;
- a backside additive comprising EcoSynthetix® EcoSphere® 2330 and a glyoxal crosslinker, and Clear Aquavar™ 2044DE as the clearcoat;
- a backside additive comprising Ingredion™ PenCote™ L800 and a potassium zirconium crosslinker, and Clear Aquavar™ 2120DE as the clearcoat;
- a backside additive comprising Ingredion™ Redifilm™ 5800 and a potassium zirconium crosslinker, and Clear Aquavar™ 2120DE as the clearcoat; and
- a backside additive comprising EcoSynthetix® EcoSphere® 2330 and a potassium zirconium crosslinker, and Clear Aquavar™ 2120DE as the clearcoat.

The backside additive according to the present disclosure may also contain additional components that may allow for at least one of higher-solids operations, greater dry rigidity, greater wet rigidity, and higher Consumer Acceptance Scores. Examples of such additional components include surfactants, plasticizers, humectants and combinations thereof.

In certain of the embodiments containing these coatings packages, the paperboard products have a rigidity value ranging from 375 to 500. Non-limiting, exemplary ranges include rigidity values of 400 to 500, 425 to 500, 450 to 500, 475 to 500, 375 to 475, 400 to 475, 425 to 475, 450 to 475, 375 to 450, 400 to 450, 425 to 450, 375 to 425, and 400 to 425. In additional embodiments, these rigidity values are produced in paper products formed from 18-point, 20-point, 22-point, and 24-point paper stock.

A paperboard plate according to an exemplary embodiment of this disclosure may be shaped as a substantially round plate with a circular-shaped outer perimeter having a characteristic diameter, wherein the characteristic diameter is simply the outer diameter of the plate. Alternatively, the plate may be shaped as a symmetrically oval (elliptical) plate having a major axis defining the longest diameter of the elliptically-shaped outer perimeter of the plate and going through the center of the plate from one outer peripheral edge of the plate to an opposite peripheral edge of the plate, and a minor axis perpendicular to the major axis and defining the shortest diameter of the elliptically-shaped outer perimeter of the plate, extending through the center of the plate from another outer peripheral edge of the plate to an opposite peripheral edge of the plate. The characteristic diameter of such an elliptically-shaped plate may be the arithmetic average of the lengths of the major and minor axes.

Additional embodiments are directed to a paperboard product comprising at least one modified starch and at least one crosslinker, wherein the paperboard product has a circular-shaped outer perimeter and further comprises: a substantially planar bottom region; a frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the product, the frustoconical sidewall extends upward and outward from the bottom region at an angle of 24.0±0.5 degrees from a vertical line parallel to a central axis of the product, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the product.

The terminology "frustoconical" as used herein in connection with the profiles of paperboard plates or other paperboard products disclosed herein refers to an arcuate surface of rotation profile where it is seen that a sidewall of the container is either curved or frustoconical in shape or composed of combinations of these two shapes. In some cases, a container may be formed by combining portions of several surfaces of rotation as in the case of ovals or other non-circular shapes.

In one particular embodiment directed to improved processing techniques, new 10.25" round paper plate die trials were conducted to produce plates for FPI Rigidity, Harmonized Hot Oil, and Single Service Microwave testing. The die design set forth in FIG. 1. FIG. 1A depicts an embodiment of a cross section of a die, consistent with embodiments of the present disclosure. Die 100 may include knockdown ear 102, draw ring 104, probe block 110, heater clamp 112, and heater 114. In some embodiments, draw ring 104 may hold paperboard against a draw pad on female cavity 122 as material enters female cavity 122. Draw ring 104 may force paper to control wrinkle formation. For example, draw ring 104 may force excess papers into scored areas to ensure neat gathers are made. In some embodiments, moisture in the material may enable soft and pliable properties. Female plunger 120 may raise and/or retract to eject formed plates. In some embodiments, draw ring 104 may surround male body 106. Die 100 may include knockdown ear 102, male body 106, male flange 108, female flange 116, and plunger retainer 118.

Figure 1A:
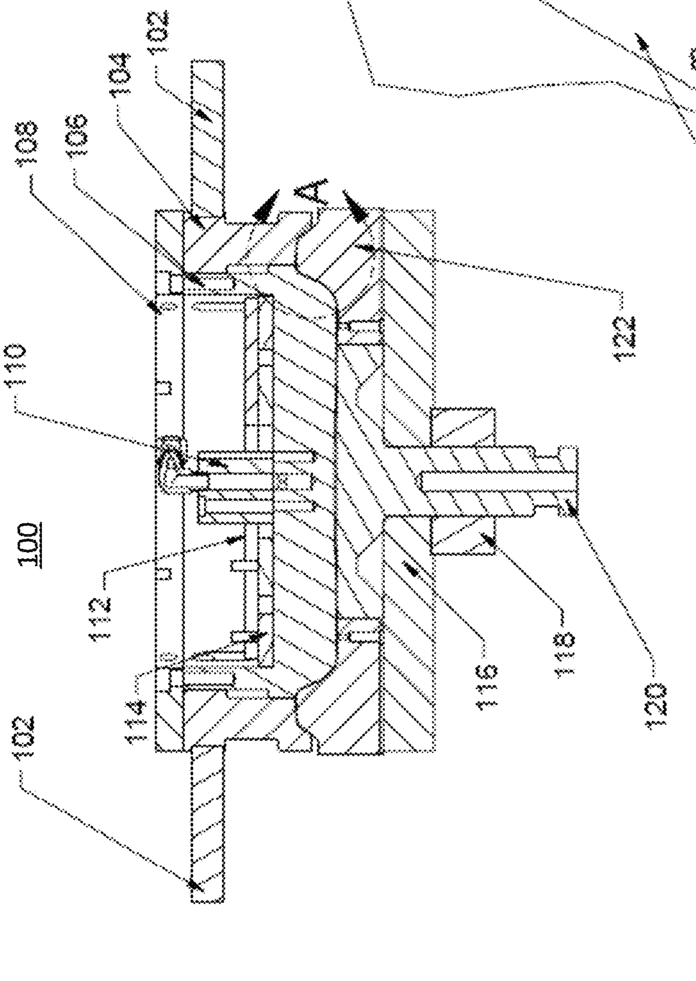
FIG. 1A depicts a cross-section of a die design for a 10.25" round plate in accordance with the present disclosure.

FIG. 1B depicts an enlarged cross-sectional profile of portions of exemplary embodiments of dies that may be used in forming paperboard plates. Exemplary paperboard plate 1000 may be formed within the illustrated gap between an upper portion of a die that includes radially inner upper male body portion 106 and radially outer upper male body draw ring portion 104, and a lower female body cavity portion 122 of the die. Paperboard plate 1000 may include a substantially planar bottom region 1002, a frustoconical sidewall 1004 extending upward and outward from an outer periphery of bottom region 1002, an annular inner brim portion 1006 contiguous with a radially outer extent of frustoconical sidewall 1004, and an annular outer frustoconical brim portion 1008 contiguous with annular inner brim portion 1006. A first arcuate portion 1020 may interconnect bottom region 1002 and a radially inner end of frustoconical sidewall 1004, and a second arcuate portion 1022 may interconnect the radially outer extent of frustoconical sidewall 1004 and annular inner brim portion 1006. A third arcuate portion 1024 may interconnect annular inner brim portion 1006 and annular outer frustoconical brim portion 1008. Annular outer frustoconical brim portion 1008 may include a distal concave lip portion 1010 around the outer periphery of plate 1000. Bottom region 1002 and frustoconical sidewall 1004 of plate 1000 may be pressed to a thickness of 0.018 inch (18 pt.) while annular inner brim portion 1006 may be pressed to a thickness of 0.020 inch, and annular outer frustoconical brim portion 1008 may be pressed to a thickness of 0.023 inch.

In the exemplary embodiment of plate 1000, for which a partial cross-sectional profile is illustrated by the gap between the upper portion of a die including upper male body portions 106, 104, and lower female body portion 122, frustoconical sidewall 1004 may extend upward and outward from substantially planar bottom region 1002 at an angle of 24.0±0.5 degrees from a vertical line parallel to a central axis of plate 1000. Annular inner brim portion 1006 may slope downward and outward from the radially outer extent of frustoconical sidewall 1004 at an angle that is 4.0±0.5 degrees from a horizontal line parallel to bottom region 1002. Annular outer frustoconical brim portion 1008 may slope downward more steeply than the downward slope of annular inner brim portion 1006, extending from the radially outer extent of annular inner brim portion 1006 at an angle that is 40.0±0.5 degrees from the vertical line parallel to the central axis of plate 1000.

Additionally, in certain embodiments, the substantially planar bottom region has a thickness of 0.018±0.0005 inch, the frustoconical sidewall has a thickness of 0.018±0.0005 inch, the annular inner brim portion has a thickness of 0.020±0.0005 inch, and the annular outer frustoconical brim portion has a thickness of 0.023±0.0005 inch.

The die shape described in FIG. 1 has steeper sidewalls and larger rim dimensions than a previous commercial die design, which has remained relatively unchanged since its original design and launch in 2007. This previous commercial die design is set forth in FIG. 2.

Figure 2A:
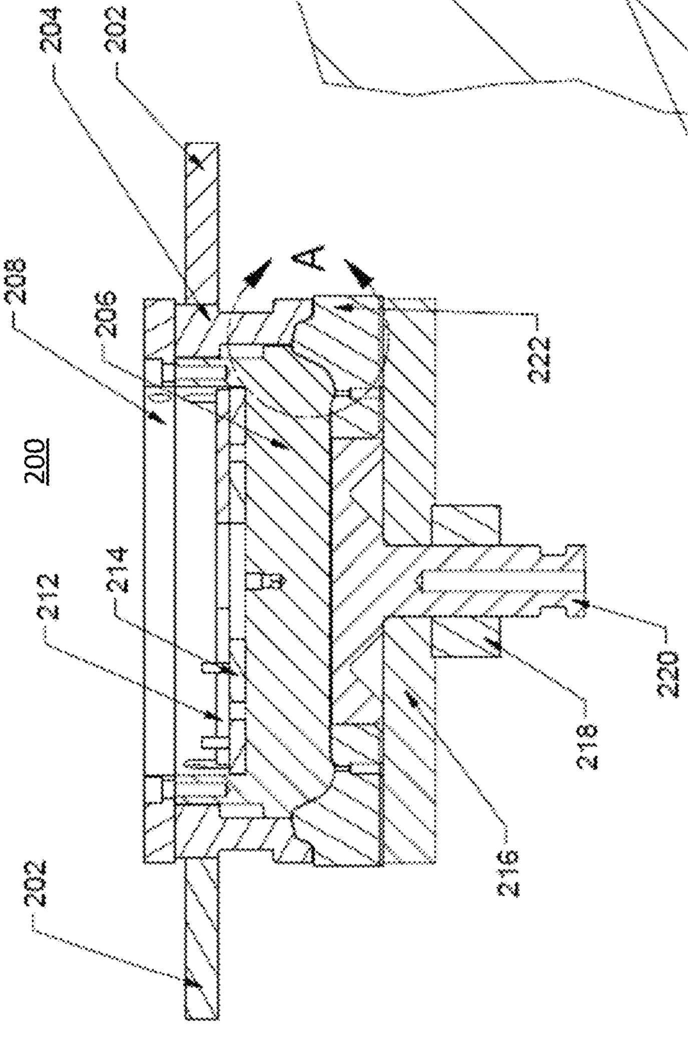
FIG. 2A depicts a cross-section of a previous commercial die design for a 10.25" round plate.

FIG. 2A depicts a cross section of the previous commercial die design. Die 200 includes knockdown ear 202, draw ring 204, probe block 210, heater clamp 212, and heater 214. Draw ring 204 holds paperboard against a draw pad on female cavity 222 as material enters female cavity 222. Draw ring 204 forces paper to control wrinkle formation. Female plunger 220 raises and/or retracts to eject formed plates. The draw ring 204 surrounds male body 206. Die 200 also includes knockdown ear 202, male body 206, male flange 208, female flange 216, and plunger retainer 218.

Figure 2B:
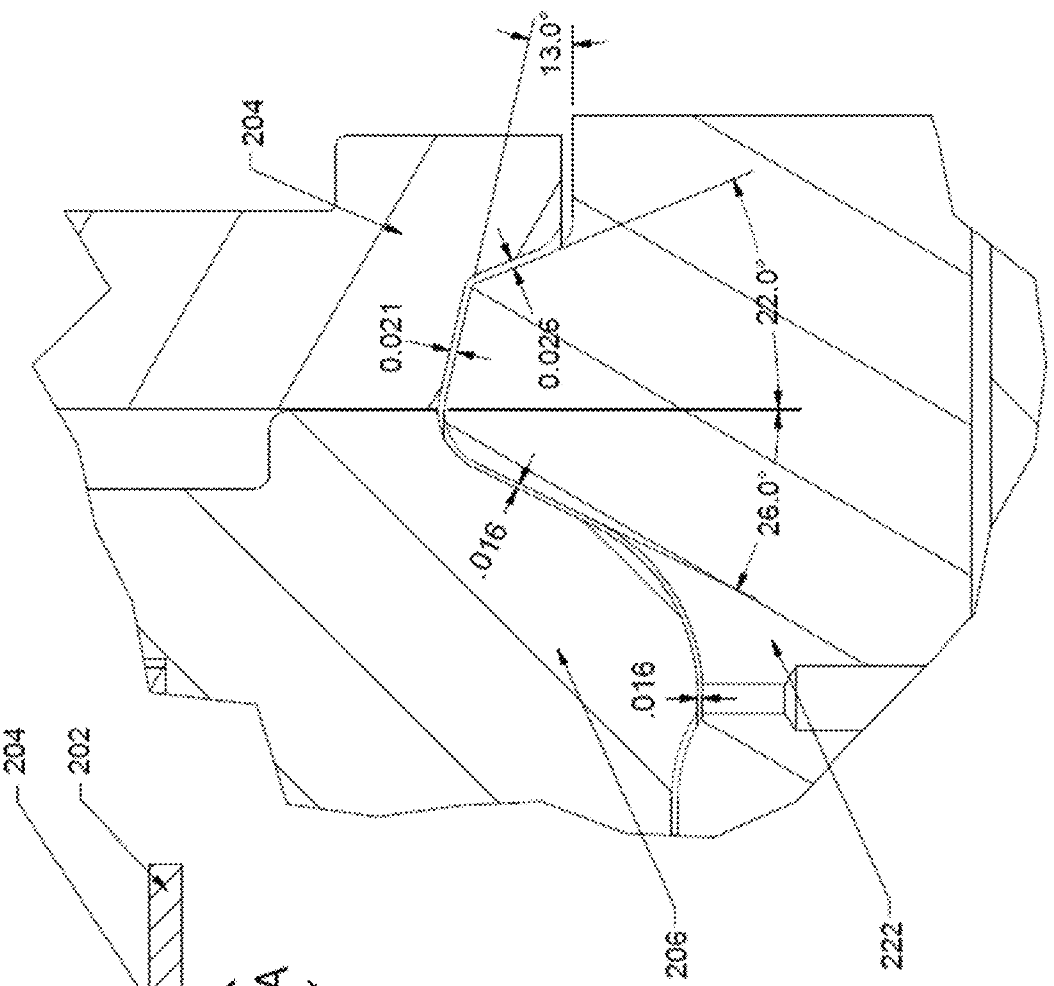
FIG. 2B depicts a blow-up of a portion of the die design of FIG. 2A.

In FIG. 2B, plate 2000, for which a partial cross-sectional profile is illustrated by the gap between the upper portion of a die including upper male body portions 206, 204, and lower female body portion 222, frustoconical sidewall 2004 extends upward and outward from substantially planar bottom region 2002 at an angle to 26.0±0.5 degrees from a vertical line parallel to a central axis of the plate. Annular inner brim portion 2006 slopes downward and outward from the radially outer extent of frustoconical sidewall 2004 at an angle that is 13.0±0.5 degrees from a horizontal line parallel to bottom region 2002. Annular outer frustoconical brim portion 2008 slopes downward more steeply than the downward slope of annular inner brim portion 2006, extending from the radially outer extent of annular inner brim portion 2006 at an angle that is equal to 22.0±0.5 degrees from the vertical line parallel to the central axis of plate 2000. A first arcuate portion 2020 interconnects bottom region 2002 and a radially inner end of frustoconical sidewall 2004, and a second arcuate portion 2022 interconnects the radially outer extent of frustoconical sidewall 2004 and annular inner brim portion 2006. A third arcuate portion 2024 interconnects annular inner brim portion 2006 and annular outer frustoconical brim portion 2008. Annular outer frustoconical brim portion 2008 includes a distal concave lip portion 2010 around the outer periphery of plate 2000.

Additional embodiments are directed to a paperboard product comprising at least one modified starch and at least one crosslinker, wherein the paperboard product has an elliptically-shaped outer perimeter and further comprises: a substantially planar bottom region; a substantially frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the product, the frustoconical sidewall extends upward and outward from the bottom region at an angle of 22.0±0.5 degrees from a vertical line parallel to a central axis of the product, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the product.

Figure 14B:
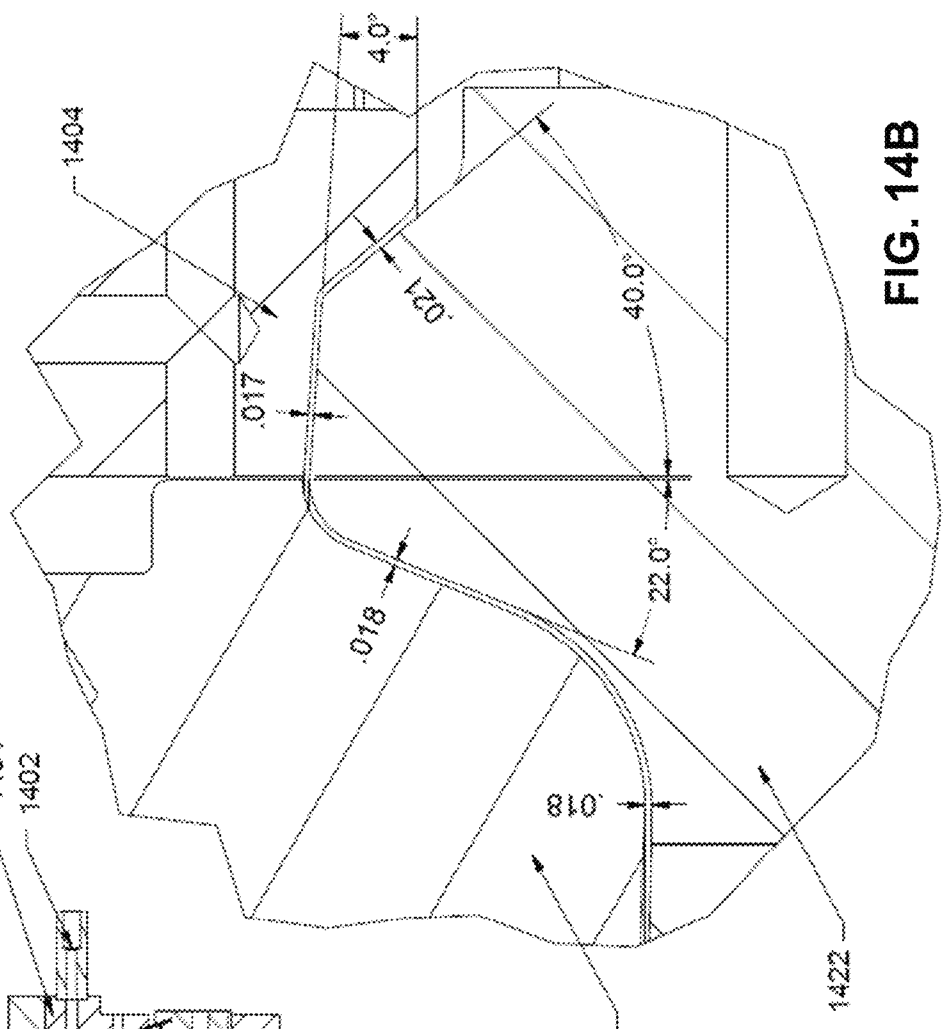
FIG. 14B depicts a blow-up of a portion of the die design of FIG. 14A.
Figure 14A:
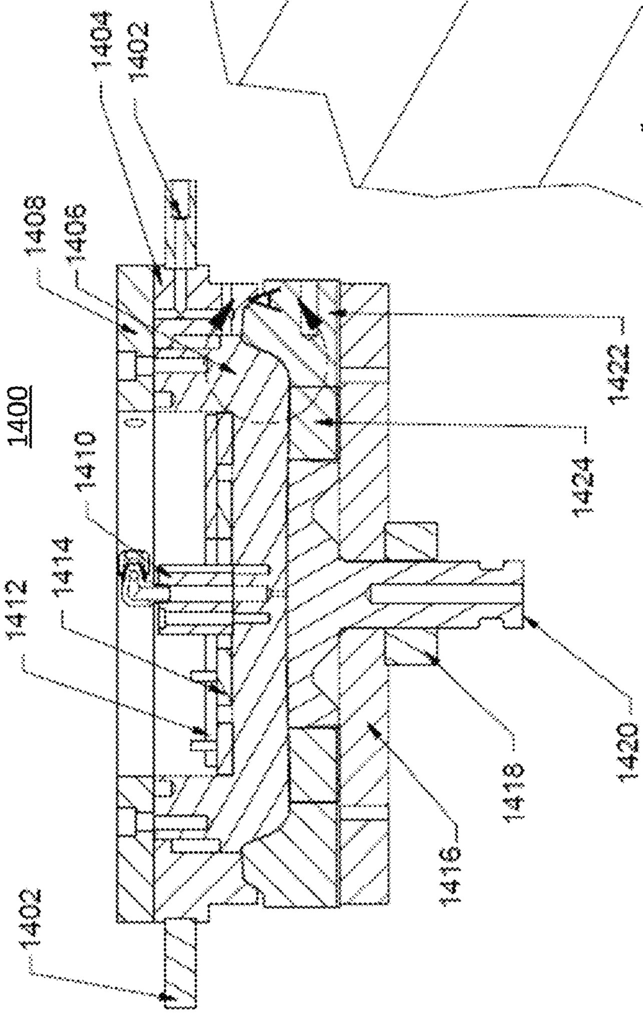
FIG. 14A depicts a cross-section of a die design for a 10"×12" oval plate in accordance with the present disclosure.

FIG. 14A depicts an embodiment of a cross section of a die, consistent with embodiments of the present disclosure. Die 1400 may include knockdown ear 1402, draw ring 1404, probe block 1410, heater clamp 1412, heater 1414, and female insert 1424. In some embodiments, draw ring 1404 may hold paperboard against a draw pad on female cavity 1422 as material enters female cavity 1422. Draw ring 1404 may force paper to control wrinkle formation. For example, draw ring 1404 may force excess papers into scored areas to ensure neat gathers are made. In some embodiments, moisture in the material may enable soft and pliable properties. Female plunger 1420 may raise and/or retract to eject formed plates. In some embodiments, draw ring 1404 may surround male body 1406. Die 1400 may include knockdown ear 1402, male body 1406, male flange 1408, female flange 1416, and plunger retainer 1418.

FIG. 14B depicts an enlarged cross-sectional profile of a portion of an exemplary embodiment of a die that may be used in forming paperboard plates. Exemplary paperboard plate 140 may be formed within the illustrated gap between an upper portion of a die that includes radially inner upper male body portion 1406 and radially outer upper male body draw ring portion 1404, and a lower female body cavity portion 1422 of the die.

Paperboard plate 140 may include a substantially planar bottom region 142, a substantially frustoconical sidewall 144 extending upward and outward from an outer periphery of bottom region 142, an annular inner brim portion 146 contiguous with a radially outer extent of frustoconical sidewall 144, and an annular outer substantially frustoconical brim portion 148 contiguous with annular inner brim portion 146. A first arcuate portion 143 may interconnect bottom region 142 and a radially inner end of frustoconical sidewall 144, and a second arcuate portion 145 may interconnect the radially outer extent of frustoconical sidewall 144 and annular inner brim portion 146. A third arcuate portion 147 may interconnect annular inner brim portion 146 and annular outer frustoconical brim portion 148. Annular outer frustoconical brim portion 148 may include a distal concave lip portion 149 around the outer periphery of plate 140. Bottom region 142 and frustoconical sidewall 144 of plate 140 may be pressed to a thickness of 0.018 inch (18 pt.) while annular inner brim portion 146 may be pressed to a thickness of 0.017 inch (17 pt.), and annular outer frustoconical brim portion 148 may be pressed to a thickness of 0.021 inch (21 pt.).

In the exemplary embodiment of plate 140, for which a partial cross-sectional profile is illustrated by the gap between the upper portion of a die including upper male body portions 1406, 1404, and lower female body portion 1422, frustoconical sidewall 144 may extend upward and outward from substantially planar bottom region 142 at an angle of 22.0±0.5 degrees from a vertical line parallel to a central axis of plate 140. Annular inner brim portion 146 may slope downward and outward from the radially outer extent of frustoconical sidewall 144 at an angle that is 4.0±0.5 degrees from a horizontal line parallel to bottom region 142. Annular outer frustoconical brim portion 148 may slope downward more steeply than the downward slope of annular inner brim portion 146, extending from the radially outer extent of annular inner brim portion 146 at an angle that is 40.0±0.5 degrees from the vertical line parallel to the central axis of plate 140.

Additionally, in certain embodiments the substantially planar bottom region of the paperboard product has a thickness of 0.018±0.0005 inch, the frustoconical sidewall has a thickness of 0.018±0.0005 inch, the annular inner brim portion has a thickness of 0.017±0.0005 inch, and the annular outer frustoconical brim portion has a thickness of 0.021±0.0005 inch.

Figure 15A:
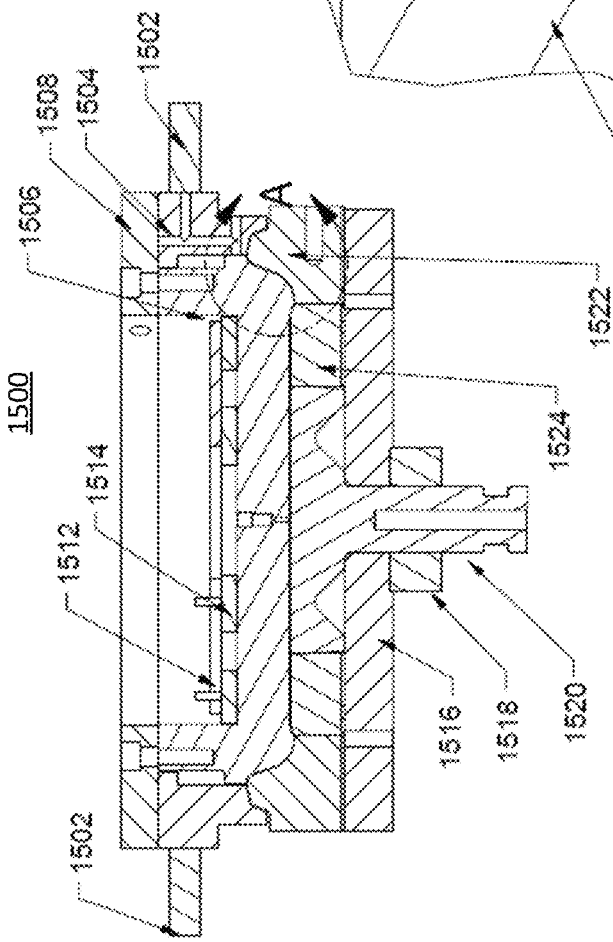
FIG. 15A depicts a cross-section of a previous commercial die design for a 10"×12" oval plate.
Figure 15B:
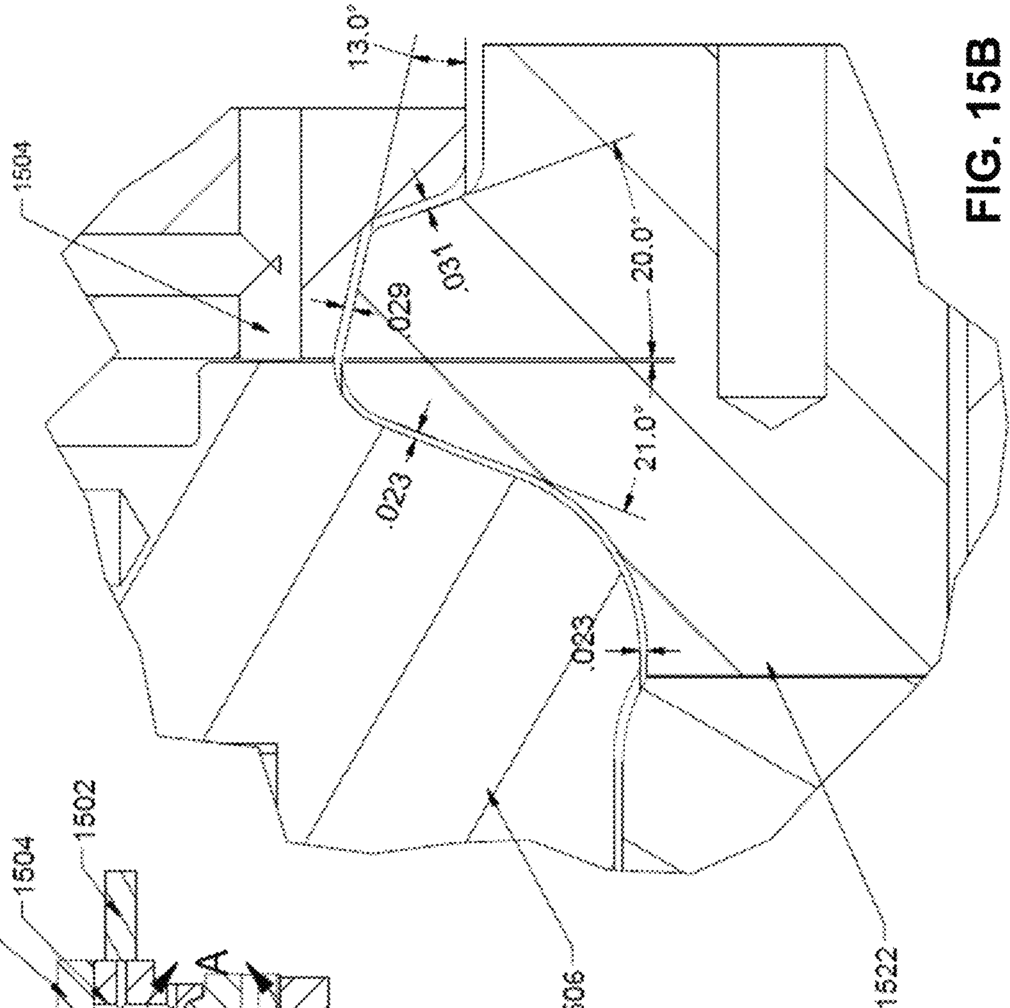
FIG. 15B depicts a blow-up of a portion of the die design of FIG. 15A.

FIGS. 15A and 15B depicts an embodiment of a cross section of a previous commercial die design for a 10"×12" oval plate. Die 1500 includes knockdown ear 1502, draw ring 1504, heater clamp 1512, heater 1514, and female insert 1524. Draw ring 1504 holds paperboard against a draw pad on female cavity 1522 as material enters female cavity 1522. Draw ring 1504 forces paper to control wrinkle formation.

Draw ring 1504 may force excess papers into scored areas to ensure neat gathers are made. Female plunger 1520 raises and/or retracts to eject formed plates. Draw ring 1504 surrounds male body 1506. Die 1500 includes knockdown ear 1502, male body 1506, male flange 1508, female flange 1516, and plunger retainer 1518.

Additional embodiments of the present disclosure are directed to process for making a rigid paperboard product, the process comprising: a) providing a paperboard material to a die press in a plate former; b) applying pressure to the plate former in an amount ranging from four tons to eleven tons; c) applying a backside coating to the formed plate using a press coater, wherein the backside coating comprises at least one modified starch in an amount ranging from 2% to 20% by weight of the paperboard product, and at least one crosslinker in an amount ranging from 0.5% to 8% by weight based on the dry weight of the starch content in the paperboard product.

Another embodiment of the present disclosure is directed to a process for making a rigid paper plate, the process comprising: a) providing a paperboard material to a die press in a plate former, wherein the die press has a rim design configured to produce a circular-shaped plate comprising a substantially planar bottom region; a frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the plate, the frustoconical sidewall extends upward and outward from the bottom region at an angle of 24.0±0.5 degrees from a vertical line parallel to a central axis of the plate, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the plate; b) applying pressure to the plate former in an amount ranging from four tons to eleven tons; and c) applying a backside coating to the formed plate using a press coater, wherein the backside coating comprises at least one modified starch and at least one crosslinker.

A further embodiment of the present disclosure is directed to a process for making a rigid paper plate, the process comprising: a) providing a paperboard material to a die press in a plate former, wherein the die press has a rim design configured to produce an elliptically-shaped plate comprising a substantially planar bottom region; a substantially frustoconical sidewall extending upward and outward from an outer periphery of the bottom region; an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the plate, the frustoconical sidewall extends upward and outward from the bottom region at an angle of 22.0±0.5 degrees from a vertical line parallel to a central axis of the plate, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the plate; b) applying pressure to the plate former in an amount ranging from four tons to eleven tons; and c) applying a backside coating to the formed plate using a press coater, wherein the backside coating comprises at least one modified starch and at least one crosslinker.

In certain embodiments, high rigidity increases in plates made using dies according to the present disclosure when compare to prior commercial 10.25" round and 10"×12" Oval plates made using the previous commercial dies. A die design that improves rigidity could allow for lower temperatures and increased speed, in addition to creating a more rigid plate. Lower temperatures are also desirable to reduce wear and improve long-term reliability.

Based on the die designs according to the present disclosure, the plate formers can run at a temperature ranging from 350° F. to 475° F., and non-limiting exemplary temperature ranges include from 400-475° F., from 425-475° F., from 375-450° F., from 400-450° F., and from 375-425° F. In certain embodiments, the plate formers are run at a temperature chosen from 375° F., 380° F., 390° F., 400° F., 410° F., 420° F., and 425° F. High temperatures can also result in more forced deterioration of wear parts on the plate former machinery, including expensive cam roller surfaces and bearings.

In certain embodiments, the plate former can run at a rate of 32 to 50 strokes per minutes. Non-limiting exemplary ranges include from 32 to 48 strokes per minute, from 32 to 44 strokes per minute, from 32 to 40 strokes per minute, from 32 to 38 strokes per minute, from 32 to 36 strokes per minute, from 34 to 48 strokes per minute, from 34 to 44 strokes per minute, from 34 to 40 strokes per minute, from 34 to 36 strokes per minute, from 36 to 44 strokes per minute, from 34 to 40 strokes per minute, from 34 to 38 strokes per minute, from 36 to 48 strokes per minute, from 36 to 44 strokes per minute, and from 36 to 40 strokes per minute. In certain embodiments, the plate former can run at a rate of from 34 to 38 strokes per minute at a temperature ranging from 375-425° F. In a further embodiment of the present disclosure, the plate former can run at a rate of from 36 strokes per minute at a temperature of 400° F.

The dwell time in the die can be dependent on the run rate of the plate former. In certain embodiments, the dwell time of the paperboard material in the paper former die can range from 0.40 seconds to 1.0 seconds per formed plate. Non-limiting exemplary dwell-time ranges include from 0.40 to 0.90 seconds, from 0.44 to 0.86 seconds, from 0.48 to 0.82 seconds, from 0.52 to 0.78 seconds, from 0.56 to 0.74 seconds, from 0.60 to 0.70 seconds, and from 0.64 to 0.68 seconds. In an additional embodiment of the present disclosure, the dwell time of the paperboard material in the paper former is 0.66 seconds.

The number of springs used in the plate formers can be varied to adjust the pressure applied to the dies in the plate former, and each spring applies one ton of pressure to the die. Certain embodiments of the present disclosure are directed to applying four tons to eleven tons of pressure on the dies in the plate former. Non-limiting, exemplary amounts of pressure that can be applied to the plate-forming die include from four to ten tons, four to eight tons, from four to six tons, four tons, five tons, six tons, seven tons, eight tons, nine tons, ten tons, and eleven tons. In certain embodiments, it may be desirable to operate the plate former under higher pressure to produce more rigid, lower fiber-containing paperboard products, while accepting a potentially higher cost of planned and scheduled maintenance.

EXAMPLES

In results set forth in the present disclosure, printed paperboard blanks were used comprising 18-point Clearwater, 20-point WestRock, 22-point WestRock and 24-point SAPPI. The results enhanced the understanding of the impact of plate structural geometry on paper plate rigidity and consumers' perceived "thickness" and "strength" of the plate. The test press provided a residence time of 0.66 seconds under four tons of pressure, after which the plate-forming die opens and the newly-formed plate is ejected.

The objectives of this trial was to: (1) determine the effect of the die shape on FPI Rigidity; (2) determine pass or fail results on FPI Hot Oil; and (3) determine pass or fail results on FPI Single Use Microwave Service. The results of this trial are set forth below, with the summary of results contained in Table 1 and the detailed results contained in Table 2.

SUMMARY OF RESULTS

TABLE 1

| Rigidity Summary with 4 spring-setup, and the board tested, as-received with no moisture added | |
|---|---|
| 18 pt. Clearwater | 325 |
| 20 pt. WestRock | 470 |
| 22 pt. WestRock | 461 |
| 24 pt. SAPPI | 450 |

TABLE 2

| | Board Vendor | Moisture | FPI Rigidity | FPI Hot Oil | FPI "Bacon" |
|---|---|---|---|---|---|
| 18 pt. R&D Die - 4 spring | Clearwater | | 325 | pass | pass |
| 18 pt. R&D Die - 6 spring | Clearwater | | 353 | pass | pass |
| 20 pt. R&D Die - 4 spring | WestRock | | 470 | pass | pass |
| 20 pt. R&D - 6 spring | WestRock | | 515 | pass | pass |
| 20 pt. R&D Die - 4 spring | WestRock | w/added moisture | 549 | pass | pass |
| 20 pt. R&D Die - 4 spring | WestRock | 6.4 | 470 | pass | pass |
| 22 pt. R&D Die - 4 Spring | WestRock | 6.4 | 461 | pass | pass |
| 22 pt. R&D Die - 6 spring | WestRock | 6.4 | 516 | pass | pass |
| 22 pt. R&D Die - 4 spring | WestRock | w/added moisture | 565 | pass | pass |
| 24 pt. R&D Die - 4 springs | SAPPI | 7.0 | 450 | pass | pass |
| 24 pt. R&D Die with 6 springs | SAPPI | 7.0 | 480 | pass | pass |
| 24 pt. R&D Die with 4 springs | SAPPI | w/added moisture | 583 | pass | pass |

Using the die design shown in FIG. 1, a new plate design was manufactured and installed in a Peerless Plate Former. Paperboard was printed and manufactured using the highly branched glyoxal-crosslinked amylopectin chemical formulation at an application rate in the range of 1.0-3 pounds/3000 $ft^2$, with a target range of 1.25 pounds/3000 $ft^2$.

The new FIG. 1 die design resulted in a paper plate rigidity increase ranging from 15 to 20% using commodity paperboard. This result was shown on various commodity paperboards in different regions of the United States, such as Maine, Arkansas, and Alabama, where the wood basket and paperboard composition, e.g., percentage of hardwood, percentage of softwood, percentage of chemi-mechanical and fiber morphology, can vary significantly.

Figure 11:
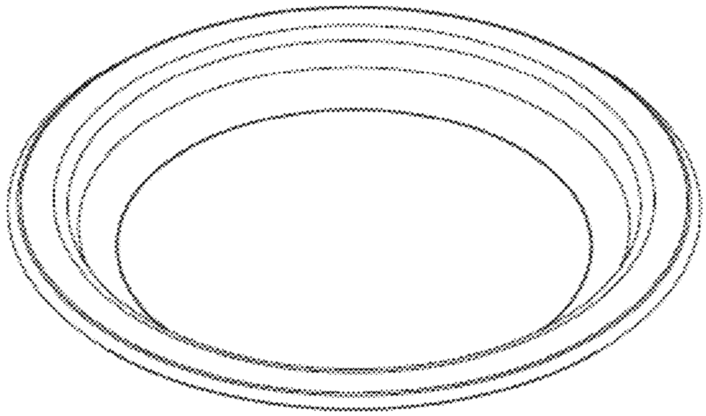
FIG. 11 depicts a 10.25" round plate in accordance with the present disclosure.
Figure 12:
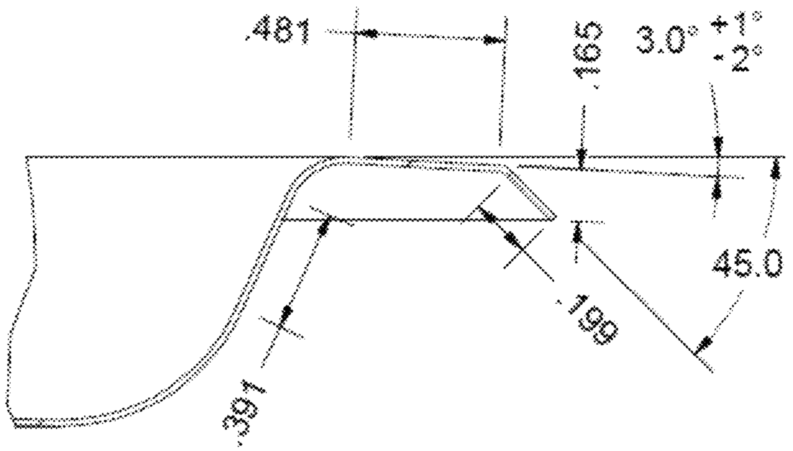
FIG. 12 depicts a cross-sectional shape of the 10.25" round plate depicted in FIG. 11.
Figure 13A:
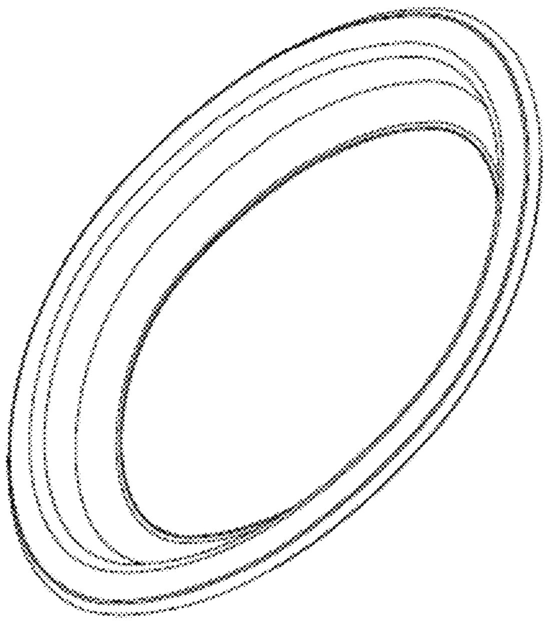
FIG. 13A depicts a 10"×12" oval plate in accordance with the present disclosure.
Figure 13B:
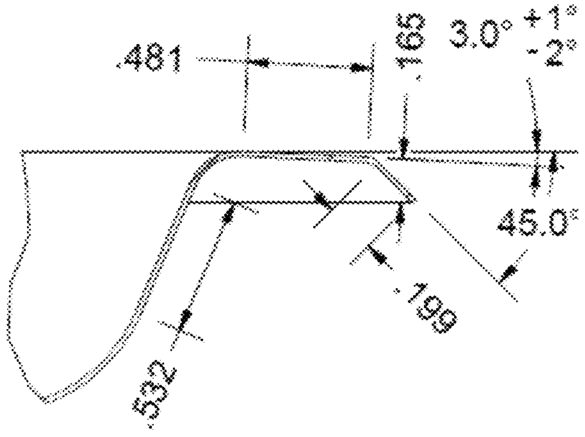
FIG. 13B depicts a cross-sectional shape of the 10"×12" oval plate depicted in FIG. 13A.

In additional plate forming examples, two sets of plates were manufactured using the dies described above: a 10.25" round design and a 10"×12" oval design. The 10.25" round plate had a general shape depicted in FIG. 11A, and a cross-sectional shape and depicted in FIG. 11B. The 10"×12" oval plate had a general shape depicted in FIG. 13A and a cross-sectional shape depicted in FIG. 13B. The 10"×12" oval plate was manufactured using two paper stocks: 20-point WestRock platestock and 24-point GPI platestock.

Plates made with the highly branched glyoxal-crosslinked amylopectin and the dies according to the present disclosure demonstrate high rigidity when wetted with various foods. This was an improvement over prior commercial products, which showed a loss in rigidity and weight holding capacity.

Figure 17:
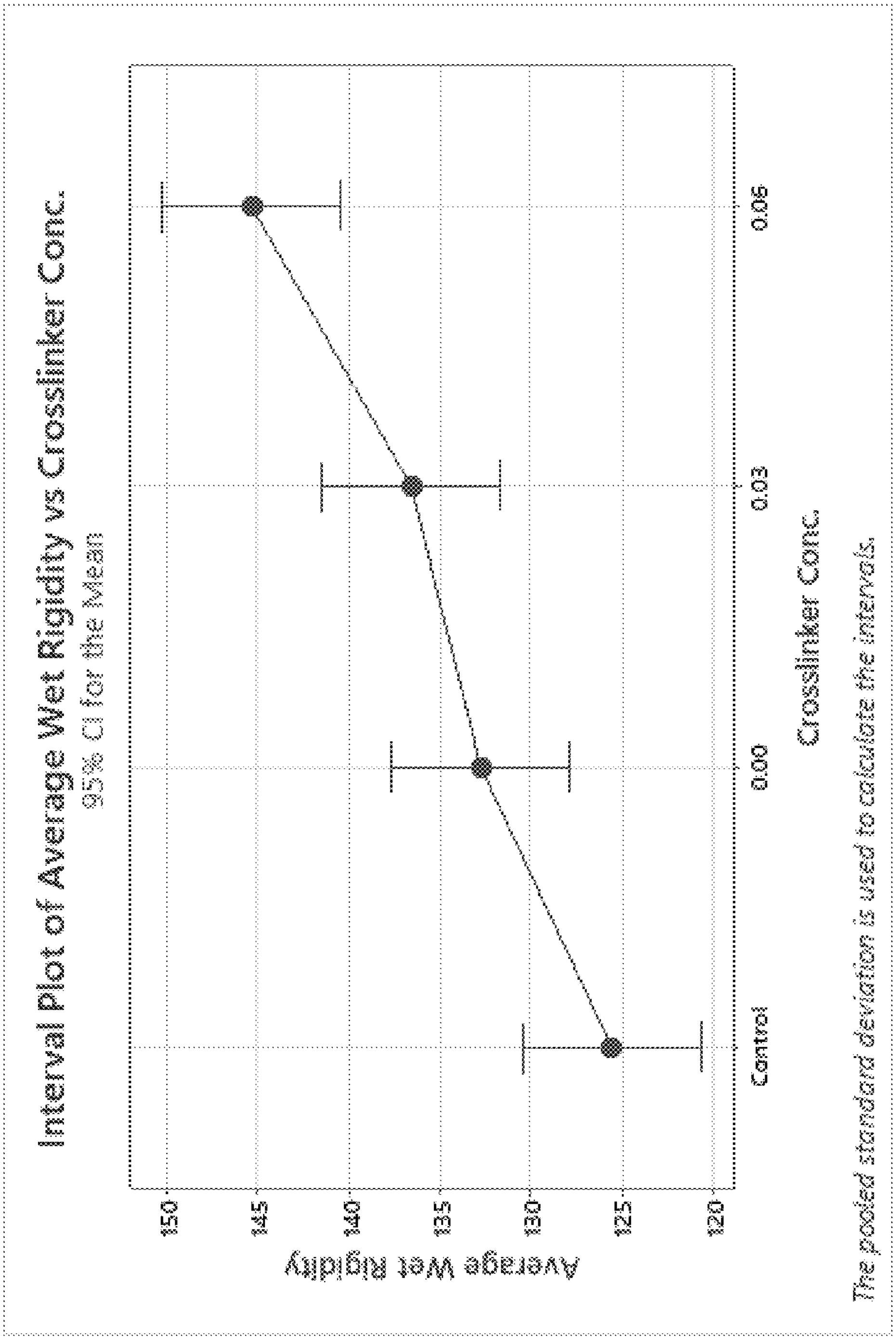
FIG. 17 depicts data showing the relationship between crosslinker concentration and average wet rigidity.

Without being bound by theory, it is believed that the crosslinking of the amylopectin prevents the amylopectin from resolubilizing when exposed to hot water, oil, and grease. In paper plates manufactured with starch applied at the size press of a paperboard machine, the starch is not crosslinked. This would have a negative effect on the properties of the product because subsequent crosslinking would interfere with ability of the paperboard to form properly in the forming dies. FIG. 17 contains data showing the effect of crosslinker concentration on wet rigidity Analysis of One Plate Sample The following tests were requested on one plate sample: Starch in paper (TAPPI T 419); Infrared Spectroscopy Identification; Microscopy; SEM; Species Percent, Basis Weight (TAPPI/ANSI T 410); Caliper (TAPPI/ANSI T 411); Water Drop (TAPPI T 831); Overall Average Weight; Net Count, Dimensions; Cobb Test (TAPPI/ANSI T 441); Grease Resistance-Kit Test (TAPPI T 559); Mullen Burst (TAPPI T 807); Taber Stiffness (TAPPI T 489); Water Resistance; FPI-Hot Oil; Cut Resistance; Sam's Club Microwave Test; and FPI-Rigidity.

Figure 10:
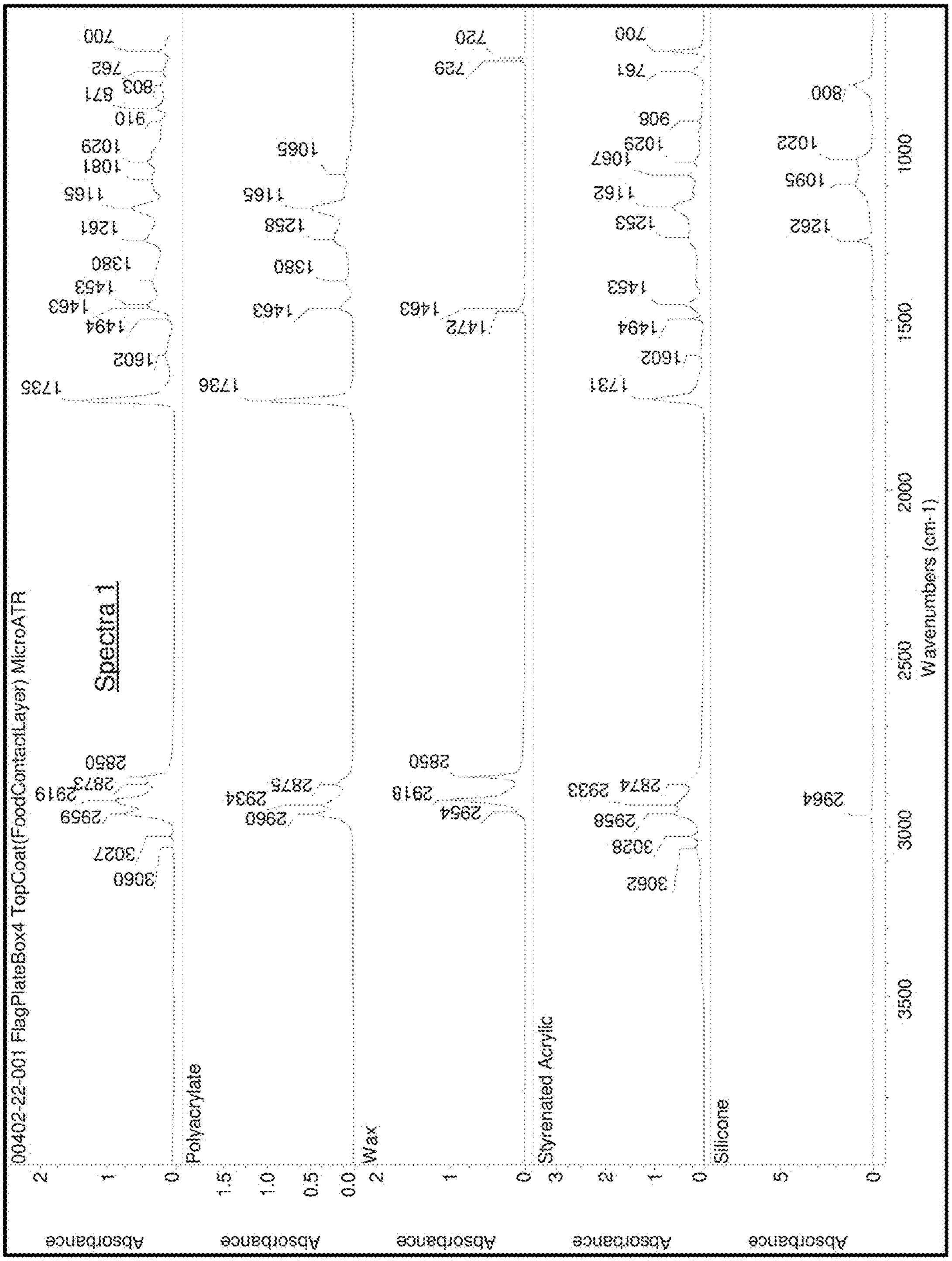
FIG. 10 depicts IR Spectra of the topcoat of the sample plate in FIG. 3. in accordance with the present disclosure.

FIG. 3 contains a photo of the sample as received. FIGS. 4-9 are images from the SEM/Microscopy testing directed to clearcoat thickness, claycoat thickness, and X-ray element map overlays. IR Spectra can be found in FIG. 10. The species percentages are for the respective components only, not for the entire sample.

The ISO 17025 Accreditation only applies to Basis Weight (TAPPI T 410) testing.

Figure 16A:
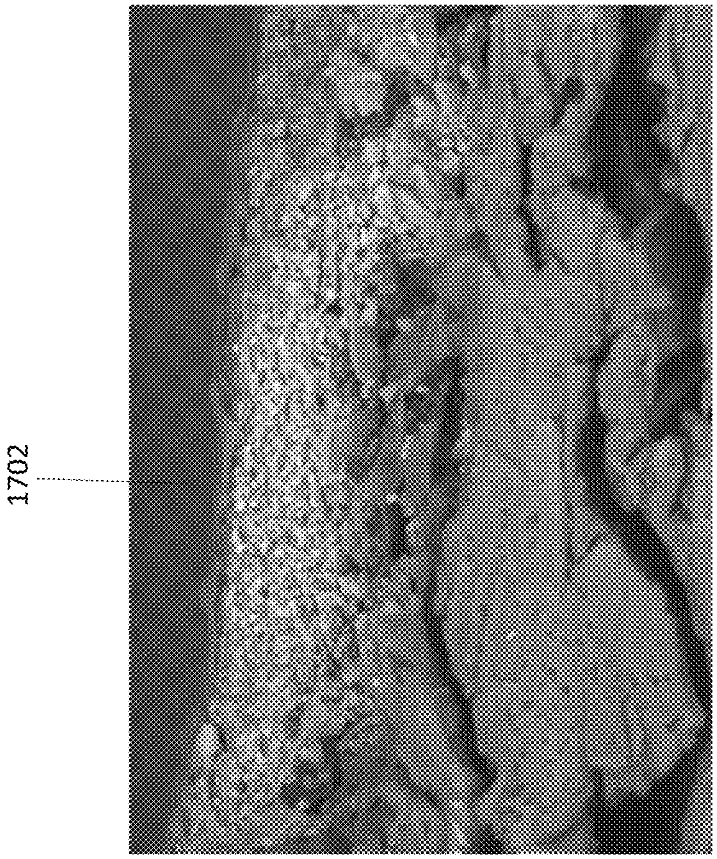
FIGS. 16A-16D depict microscope slides of formed plates according to the present disclosure.
Figure 16B:
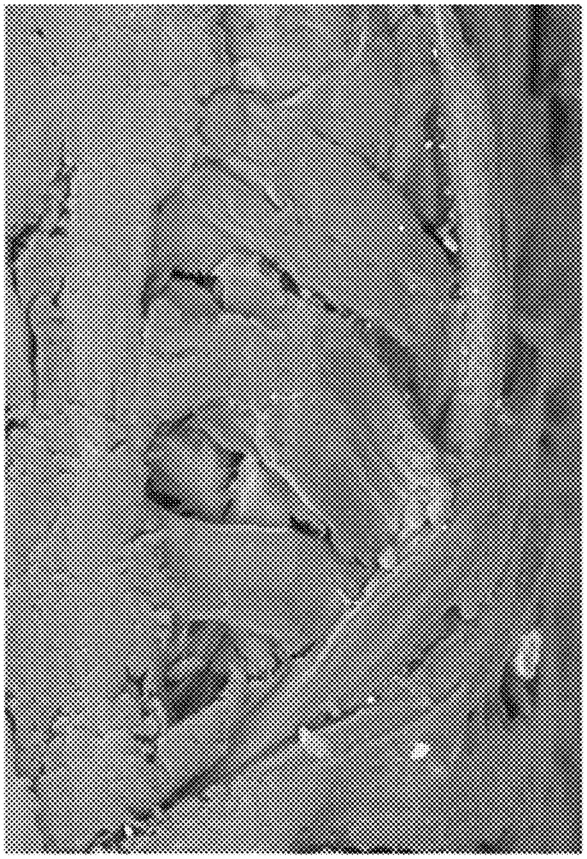
Figure 16C:
Figure 16D:
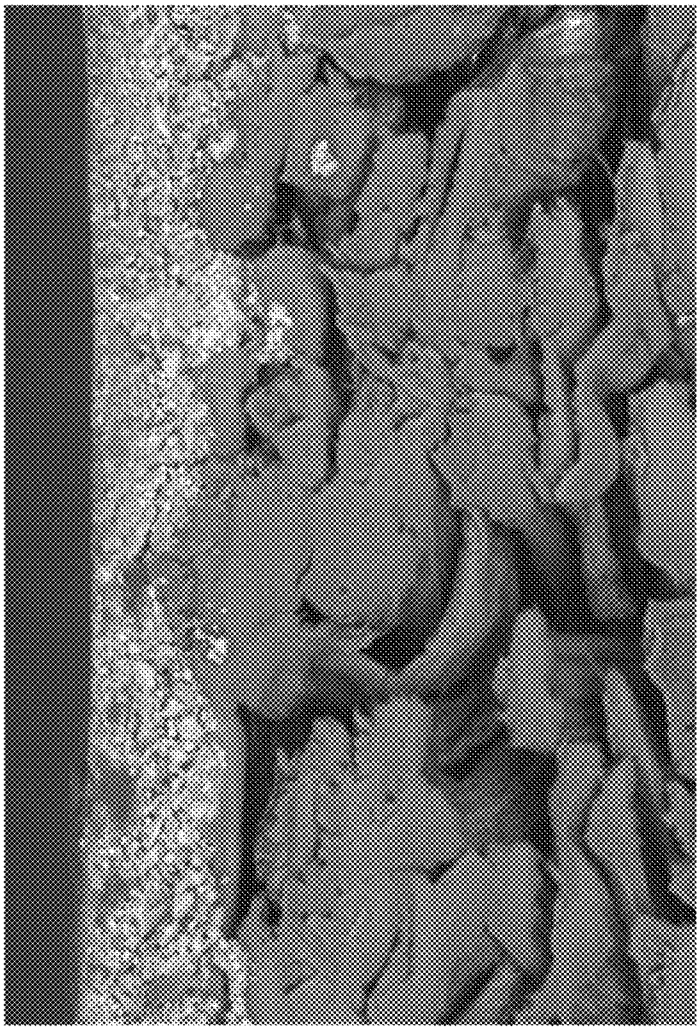

FIGS. 16A-16D depict microscope slides of formed plates, consistent with embodiments of the present disclosure. FIG. 16A illustrates a formed plate on 20 pt WestRock, including top coating 1702. FIG. 16B illustrates a bottom side of a formed plate on 20 pt WestRock, including back-side additive. FIG. 16C illustrates a bottom side of a raw 20 pt WestRock board stock. FIG. 16D illustrates a clay coating 20 pt WestRock including raw board stock.

Plate Performance Assessment

Four focus groups were conducted to provide feedback on 20-point and 24-point oval plates made using the new die design according to the present disclosure. All groups were 1½ hours in length and were comprised of Warehouse Club customers who purchase oval heavyweight disposable paper plates with a design or decoration at Warehouse Club. Sam's Club and Costco members were equally represented in the groups. Two groups were exposed to a new 24 pt. Oval plate and a new 20 pt. Oval plate, made using the die depicted in FIG. 14. All groups were also exposed to the current commercial 28 pt. Oval design.

New Oval 24 Pt.—Four Spring

Two groups (15 total participants) assessed the new Oval 24 pt. plate and the current commercial Oval 28 pt. plate individually, and then were given the opportunity to compare them head-to-head. The new Oval 24 pt. plate was made with the die depicted in FIG. 14 and was subjected to four tons of pressure in the plate former.

Handling

After handling, the new Oval 24 pt. plate was evaluated for expected performance overall and on four key criteria: Rim/Edge Strength, Food Holding Capacity/Strength, Leakproof, Cut Resistance. Based on the data set forth in Table 3, the new Oval 24 pt. plate was held to be as good as or better than other oval heavy weight disposable paper plates respondents have purchased/used.

TABLE 3

| | NEW 24 pt. Oval HANDLING-4-Spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| As Good As Or Better | 14 | 11 | 14 | 14 | 14 |
| Much Better Than Other Decorated Heavy Weight Oval Paper Plates I Have Purchased/ Used | 2 | 2 | 2 | 5 | 4 |
| Slightly Better | 4 | 3 | 7 | 5 | 3 |
| As Good As | 8 | 6 | 5 | 4 | 7 |
| Slightly Worse | 0 | 3 | 0 | 0 | 0 |
| Much Worse Than Other Decorated Heavy Weight Oval Paper Plates I Have Purchased | 1 | 1 | 1 | 1 | 1 |

Usage

Respondents were asked to carry the new Oval 24 pt. plate to a buffet table, fill the plate with food (salad, spaghetti with sauce and meat balls), carry the full plate back to the table, and use cutlery in the manner they would normally. They were then asked to evaluate the new Oval 24 pt. plate on overall performance and four important criteria: Rim/Edge Strength, Food Holding Capacity, Leakproof, Cut Resistance.

After usage, the new Oval 24 pt. plate was again deemed as good as or better than other oval heavy weight disposable paper plates respondents have purchased/used on all criteria assessed as set forth in Table 4.

TABLE 4

| | NEW 24 pt. OVAL USAGE-4 Spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| As Good As Or Better | 15 | 12 | 14 | 15 | 15 |

TABLE 4-continued

| | NEW 24 pt. OVAL USAGE-4 Spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| Much Better Than Other Decorated Heavy Weight Oval Paper Plates I Have Purchased/ Used | 2 | 1 | 3 | 9 | 9 |
| Slightly Better | 10 | 9 | 6 | 5 | 4 |
| As Good As | 3 | 2 | 5 | 1 | 2 |
| Slightly Worse | 0 | 3 | 1 | 0 | 0 |
| Much Worse Than Other Decorated Heavy Weight Oval Paper Plates I Have Purchased | 0 | 0 | 0 | 0 | 0 |

New Oval 20 pt.—Four Spring

Two groups (12 total participants) assessed the new Oval 20 pt. plate and the current commercial Oval 28 pt. plate individually, and then were given the opportunity to compare them head-to-head. The new Oval 20 pt. plate was made with the die depicted in FIG. 14 and was subjected to four tons of pressure in the plate former.

Handling

After handling, the new Oval 20 pt. plate was evaluated for expected performance overall and on four important criteria: Rim/Edge Strength, Food Holding Capacity, Leakproof, Cut Resistance. As set forth in Table 5, the new Oval 20 pt. plate was rated as good as or better than other oval heavy weight disposable paper plates they have purchased/used Overall and on the key criteria except Rim/Edge Strength as set forth in Table 5.

TABLE 5

| | NEW 20 pt. OVAL HANDLING-4-Spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| As Good As Or Better | 7 | 5 | 8 | 11 | 10 |
| Much Better Than Other Decorated Heavy Weight Oval Paper Plates I Have Purchased/ Used | 1 | 0 | 2 | 3 | 1 |
| Slightly Better | 3 | 3 | 0 | 2 | 3 |
| As Good As | 3 | 2 | 6 | 6 | 6 |
| Slightly Worse | 5 | 7 | 4 | 1 | 2 |
| Much Worse Than Other Decorated Heavy Weight Oval Paper Plates I Have Purchased | 0 | 0 | 0 | 0 | 0 |

Usage

Respondents were asked to carry the new Oval 20 pt. plate to a buffet table, fill the plate with food (salad, spaghetti with sauce and meat balls), carry the full plate back to the table, and use cutlery in the manner they would normally. They were then asked to evaluate the new Oval 20 pt. plate on overall performance and four important criteria: Rim/Edge Strength, Food Holding Capacity, Leakproof, Cut Resistance.

After usage, the new Oval 20 pt. plate was rated as good as or better than other oval heavy weight disposable paper plates they have purchased/used in terms of Overall performance and the other criteria except Rim/Edge Strength as set forth in Table 6.

TABLE 6

| | NEW 20 pt. OVAL USAGE-4-spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| As Good As Or Better | 9 | 5 | 9 | 11 | 10 |
| Much Better Than Other Decorated Heavy Weight Oval Paper Plates I Have Purchased/ Used | 1 | 0 | 2 | 3 | 3 |
| Slightly Better | 1 | 1 | 2 | 4 | 3 |
| As Good As | 7 | 4 | 5 | 4 | 4 |
| Slightly Worse | 3 | 5 | 3 | 1 | 1 |
| Much Worse Than Other Decorated Heavy Weight Oval Paper Plates I Have Purchased | 0 | 2 | 0 | 0 | 1 |

New Oval 24 pt.—Six Spring 41 total participants assessed the new Oval 24 pt. plate and the current commercial Oval 28 pt. plate individually, and then were given the opportunity to compare them head-to-head. The new Oval 24 pt. plate was made with the die depicted in FIG. 14 and was subjected to six tons of pressure in the plate former.

Handling

After handling, the new Oval 24 pt. plate was evaluated for expected performance overall and on four key criteria: Rim/Edge Strength, Food Holding Capacity/Strength, Leakproof, Cut Resistance. As shown in Table 7, the new Oval 24 pt. plate was held to be as good as or better than other oval heavy weight disposable paper plates respondents have purchased/used.

Usage

Respondents were asked to carry the new Oval 24 pt. plate to a buffet table, fill the plate with food (salad, spaghetti with sauce and meat balls), carry the full plate back to the table, and use cutlery in the manner they would normally. They were then asked to evaluate the new Oval 24 pt. plate on overall performance and four important criteria: Rim/Edge Strength, Food Holding Capacity, Leakproof, Cut Resistance.

After usage, the new Oval 24 pt. plate was again deemed as good as or better than other oval heavy weight disposable paper plates respondents have purchased/used on all criteria assessed as set forth in Table 8.

TABLE 7

| | NEW 24 pt. Oval HANDLING-6-Spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| As Good As Or Better | 38 | 33 | 38 | 39 | 39 |
| Much Better Than Other Decorated Heavy Weight Oval Paper Plates I Have Purchased/ Used | 9 | 14 | 14 | 9 | 9 |
| Slightly Better | 12 | 12 | 15 | 15 | 19 |
| As Good As | 8 | 6 | 5 | 4 | 7 |
| Slightly Worse | 2 | 7 | 3 | 1 | 2 |
| Much Worse Than Other Decorated Heavy Weight Oval Paper Plates I Have Purchased | 1 | 1 | 0 | 1 | 0 |

TABLE 8

| | NEW 24 pt. OVAL USAGE-6 Spring | | | | |
|---|---|---|---|---|---|
| | Overall Performance | Rim/ Edge Strength (security & comfort when holding the plate that it will not spill) | Food Holding Capacity (strong enough to hold/carry heavy or abundant food without bending/ buckling) | Leakproof (liquids won't seep through) | Cut Resistant (stands up to cutlery) |
| As Good As Or Better | 40 | 38 | 39 | 40 | 39 |
| Much Better Than Other Decorated Heavy Weight Oval Paper Plates I Have Purchased/ Used | 15 | 18 | 12 | 17 | 18 |
| Slightly Better | 16 | 9 | 17 | 15 | 11 |
| As Good As | 9 | 11 | 10 | 8 | 10 |
| Slightly Worse | 1 | 2 | 2 | 1 | 2 |
| Much Worse Than Other Decorated Heavy Weight Oval Paper Plates I Have Purchased | 0 | 1 | 0 | 0 | 0 |

Backside Additives

Sample Preparation: Due to the forming process, pre-coated board was selected to facilitate efficient forming of the plates after the backside additives were applied. The board selected was 22 pt SAPPI board due to this board not having a backside additive applied. Sample blanks were hand cut to 12.5"×15", taking care to keep the dimensions as consistent as possible. Pre-dried sample blanks weighed 44.2 grams+/−0.4 grams. Sample blanks where then oven dried @210° F. to obtain the current moisture content. Oven dried samples weighed 40.9 grams±0.2 grams, calculating the average moisture to be 7.3%. Given that the theorized board moisture entering the CMS moisturizer is approximately 5%, each sample blank was dried until 42-43 grams was achieved. At this weight the sample blanks averaged 5.3% moisture prior to entering the puddle coater.

Due to the nature of this coater, two sample blanks were taped at the bottom edge with backsides facing out. This allowed for only the backside of the sample blanks to be moistened while passing through the nip. To aid in feeding the sample blanks through the nip a single thickness, 3-5" wide and 1" long 'tail' was taped to the leading edge of the double thick samples. This tail allowed for easier feeding of the sample blanks into the coater and fewer damaged edges. While 3 sets of doubled blanks, i.e. 6 total samples, were moistened for each variable, the test ended with 5 total samples due to damaged edges during the coating process.

Puddle Coater: The puddle coater was approximately 12.5" wide with a max speed of 65 rpm. Through a handful of trial samples, it was determined that 30 psi nip pressure and max speed of 65 rpm was the ideal settings to coat the samples. At this setting the coater did apply approximately 2× the coat weight as targeted. All sample sets and variables were coated using the same nip pressures and rpm. Between each variable the nip was sponge washed with warm water to remove excess backside additive. Approximately 50 mL of each backside additive was washed over the nip to clear any prior variable remnants and excess moisture. After rinsing with the current variable, another 50 mL of fresh backside additive was placed in the nip and the 3 sets of double blank samples were coated.

Forming: The final water absorption testing resulted in higher levels than the average production values. To compensate for this, die temperatures were lowered from 350° F. to 290° F. on the top die to prevent the inside of the plate brim from sticking. The bottom die temperatures were maintained at 350° F. throughout the forming process. Sample blanks were pulled and formed in random order to control and eliminate additional forming process variations.

Testing: Solution Viscosity, Amylopectin Applied, Forming Moisture, Dry Rigidity, Wet Rigidity and Water Absorption were all measured, and the results are set forth in Table 9 below.

TABLE 9

| Results | | | | | | | | | | | | | | |
|---|---|---|---|---|---|---|---|---|---|---|---|---|---|---|
| Variable | | Dry Solids | Density (lbs/ | Crosslinker 1 | | Crosslinker 2 | | Solution Viscosity | Forming Moisture | Amylo-pectin Applied | Dry Rigidity | Wet Rigidity | Water Absorption |
| ID | Description | (%) | gal) | Name | % | Name | % | (cP) | (%) | (lbs/rm) | (g) | (g) | (g) |
| 1 | Eco 2330 Control | 14 | 8.7 | EPI | 3 | None | 0 | 52 | 8.7 | 3.0 | 327 | 98 | 4.40 |
| 2 | Eco 2330 Control | 14 | 8.7 | EPI | 6 | None | 0 | 52 | 9.9 | 3.3 | 305 | 109 | 4.23 |
| 3 | Ingredion L800 | 14.7 | 10.1 | EPI | 3 | None | 0 | 45 | 8.2 | 2.9 | 329 | 96 | 4.00 |
| 4 | Ingredion L800 | 17.4 | 10.1 | EPI | 3 | None | 0 | 60 | 8.9 | 3.9 | 342 | 95 | 4.37 |

TABLE 9-continued

| Variable ID | Description | Results: Dry Solids (%) | Density (lbs/gal) | Crosslinker 1 Name | Crosslinker 1 % | Crosslinker 2 Name | Crosslinker 2 % | Solution Viscosity (cP) | Forming Moisture (%) | Amylopectin Applied (lbs/rm) | Dry Rigidity (g) | Wet Rigidity (g) | Water Absorption (g) |
|---|---|---|---|---|---|---|---|---|---|---|---|---|---|
| 5 | Ingredion L5800 | 15.5 | 9.51 | EPI | 3 | None | 0 | 53 | 9.2 | 3.5 | 325 | 107 | 3.60 |
| 6 | Ingredion L5800 | 15.5 | 9.51 | KZI | 2.5 | None | 0 | 53 | 8.7 | 3.3 | 327 | 88 | 4.77 |
| 7 | Ingredion 2030 | 12 | 9.23 | KZI | 2.5 | None | 0 | 66 | 8.7 | 2.5 | 333 | 98 | 4.43 |
| 8 | Ingredion 2030 | 12 | 9.23 | MZI | 2.5 | None | 0 | 72 | 8.9 | 2.5 | 305 | 97 | 4.63 |
| 9 | Ingredion 2030 | 12 | 9.23 | MZI | 2.5 | None | 0 | 68 | 8.5 | 2.4 | 328 | 97 | 4.43 |
| 10 | Ingredion 2030 | 12 | 9.23 | EPI | 5 | MZI | 2.5 | 76 | 8.1 | 2.3 | 306 | 91 | 4.60 |
| 11 | Ingredion 2030 | 12 | 9.23 | EPI | 5 | KZC | 2.5 | 79 | 8.6 | 2.4 | 277 | 96 | 4.27 |

Backside Additive with Clear Aquavar Coatings

Testing was conducted to optimize performance improvement with respect to heat tolerance and grease resistance. In this test, two water-based Clear Aquavar coatings 2044DE and 2120DE were evaluated as a frontside clearcoat on paperboard products. The backside additive comprised Ingredion™ Redifilm™ 5800 and a glyoxal crosslinker.

Two rolls were printed with each coating at 2 moisture levels, 8.0% and 6.5%. The rolls were printed on GPI 20 pt. board stock and this data is shown in Table 10.

TABLE 10

| Printing Order Key | | | | |
|---|---|---|---|---|
| Order | Coating | Moisture Set | Coat Wt. Digital | Foil Test |
| 1 | 2044 | 8.0% | 1.15 | 1.27 |
| 2 | | 6.5% | 1.25 | |
| 3 | 2120 | 6.5% | 1.15 | 1.15 |
| 4 | | 8.0% | 1.19 | |

A forming press was utilized for this test and all forming temperatures set points were equal between the top and bottom die. Forming was completed at a standard set point of 40 spm and 385° F. for each coating and moisture setting to establish a base line. A secondary set point of 31 spm and 425° F. was established to stress the coating, by allowing maximum heat for an increased dwell time. This data is shown in Table 11.

TABLE 11

| Forming Order Key | | | | |
|---|---|---|---|---|
| Order | Coating | Speed (SPM) | Temp. Set (° F.) | Moisture Set |
| A | 2044 | 40 | 385 | 8.0% |
| B | 2044 | 31 | 400 | 8.0% |
| C | 2044 | 31 | 425 | 8.0% |
| D | 2120 | 31 | 425 | 8.0% |
| E | 2120 | 40 | 385 | 8.0% |
| F | 2120 | 40 | 385 | 6.5% |
| G | 2120 | 31 | 425 | 6.5% |
| H | 2044 | 31 | 425 | 6.5% |
| I | 2044 | 40 | 385 | 6.5% |

Testing illustrated the impact of high moisture and die heats during the forming process on rigidity values. Clear Aquavar coatings as measured at 425° F. and 31 spm, at high and low moisture levels, performed very well by not sticking or picking at these speeds and temperatures.

Backside Additive with Clear Aquavar Coatings

Testing was conducted on 24-point and 28-point oval paperboard with a backside additive comprising Ingredion starches and crosslinkers, and a clearcoat comprising Clear Aquavar coatings. In a backside additive comprising Ingredion L5800 and glyoxal crosslinker, and a clearcoat comprising Clear Aquavar 2044DE, the resulting oval paperboard had a rigidity of 459.54 and a rim stiffness of 1793.59. Much higher die temperatures (425° F.) and higher moisture (9.0-9.5%) could be achieved using this backside additive/clearcoat.

While the present disclosure has been shown and described with reference to particular aspects thereof, it will be understood that the present disclosure can be practiced, without modification, in other environments. Additionally, while the description has been directed to plates, platters, trays, cutting boards, bowls, cups, and take-out packaging products, the foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A rigid paperboard product comprising at least one amylopectin and at least one crosslinker, wherein the at least one amylopectin is present in an amount ranging from 2% to 15% by weight of the paperboard product, wherein the at least one crosslinker is present in an amount ranging from 0.5% to 8% by weight based on the dry weight of the starch content in the paperboard product, and wherein the paperboard product has a rigidity value ranging from 375 to 500.

2. The rigid paperboard product according to claim 1, wherein the at least one amylopectin is a highly branched amylopectin present in an amount ranging from 10 to 15% based on the weight of the paperboard product.

3. The rigid paperboard product according to claim 1, where the at least one crosslinker is chosen from glyoxal crosslinkers, potassium zirconium crosslinkers, ammonia zirconium crosslinkers, citric acid crosslinkers.

4. The rigid paperboard product according to claim 3, wherein the at least one crosslinker is present in an amount ranging from 0.5 to 6% based on the weight of the paperboard product.

5. The paperboard product according to claim 1, wherein the product is chosen from 10.25" round plates and 10"×12" oval plates, and wherein the plates have a thickness ranging from 18 points to 24 points.

6. A paperboard product comprising a backside additive comprising at least one modified starch and at least one crosslinker, wherein the at least one modified starch comprises at least one amylopectin present in an amount ranging from 2% to 15% by weight of the paperboard product, wherein the at least one crosslinker is present in an amount ranging from 0.5% to 8% by weight based on the dry weight of the starch content in the paperboard product, and wherein the paper board product has a rigidity value ranging from 375 to 500.

7. A paperboard product according to claim 6, wherein the at least one modified starch is chosen from a highly branched amylopectin present in an amount ranging from 10 to 15% based on the weight of the paperboard product.

8. The rigid paperboard product according to claim 6, where the at least one crosslinker is chosen from glyoxal crosslinkers, potassium zirconium crosslinkers, ammonia zirconium crosslinkers, citric acid crosslinkers.

9. The rigid paperboard product according to claim 8, wherein the at least one crosslinker is present in an amount ranging from 0.5 to 6% based on the dry weight of the starch content in the paperboard product.

10. The rigid paperboard product according to claim 6 further comprising a frontside clearcoat.

11. The rigid paperboard product according to claim 10, wherein the clearcoat is chosen from aqueous dispersions of styrene-acrylic copolymers.

12. The paperboard product according to claim 6, wherein the product is chosen from 10.25" round plates and 10"×12" oval plates, and wherein the plates have a thickness ranging from 18 points to 24 points.

13. A paperboard product comprising at least one modified starch and at least one crosslinker, wherein the paperboard product has an elliptically-shaped outer perimeter and further comprises:

the at least one modified starch comprises at least one amylopectin present in an amount ranging from 2% to 15% by weight of the paperboard product, a substantially planar bottom region;

a substantially frustoconical sidewall extending upward and outward from an outer periphery of the bottom region;

an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the product, the frustoconical sidewall extends upward and outward from the bottom region at an angle of 22.0±0.5 degrees from a vertical line parallel to a central axis of the product, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the product.

14. The paperboard product according to claim 13, wherein the substantially planar bottom region has a thickness of 0.018±0.0005 inch, the frustoconical sidewall has a thickness of 0.018±0.0005 inch, the annular inner brim portion has a thickness of 0.017±0.0005 inch, and the annular outer frustoconical brim portion has a thickness of 0.021÷0.0005 inch.

15. The paperboard product according to claim 13, wherein the product is a 10"×12" oval plate.

16. A paperboard product comprising at least one modified starch and at least one crosslinker, wherein the paperboard product has a circular-shaped outer perimeter and further comprises:

the at least one modified starch comprises at least one amylopectin present in an amount ranging from 2% to 15% by weight of the paperboard product, a substantially planar bottom region;

a frustoconical sidewall extending upward and outward from an outer periphery of the bottom region;

an annular inner brim portion contiguous with a radially outer extent of the frustoconical sidewall; and an annular outer frustoconical brim portion contiguous with a radially outer extent of the annular inner brim portion, wherein a first arcuate portion interconnects the bottom region and a radially inner end of the frustoconical sidewall, a second arcuate portion interconnects the radially outer extent of the frustoconical sidewall and the annular inner brim portion, and a third arcuate portion interconnects the radially outer extent of the annular inner brim portion and the annular outer frustoconical brim portion, the annular outer frustoconical brim portion includes a distal concave lip portion around an outer periphery of the product, the frustoconical sidewall extends upward and outward from the bottom region at an angle of 24.0±0.5 degrees from a vertical line parallel to a central axis of the product, the annular inner brim portion slopes downward and outward from the radially outer extent of the frustoconical sidewall at an angle that is 4.0±0.5 degrees from a horizontal line parallel to the bottom region, and the annular outer frustoconical brim portion slopes downward more steeply than the downward slope of the annular inner brim portion, extending from the radially outer extent of annular inner brim portion at an angle that is 40.0±0.5 degrees from the vertical line parallel to the central axis of the product.

17. The paperboard product according to according to claim 16, wherein the substantially planar bottom region has a thickness of 0.018±0.0005 inch, the frustoconical sidewall has a thickness of 0.018±0.0005 inch, the annular inner brim portion has a thickness of 0.020±0.0005 inch, and the annular outer frustoconical brim portion has a thickness of 0.023±0.0005 inch.

18. The paperboard product according to according to claim 16, wherein the product is a 10.25" round plate.

* * * * *